United States Patent [19]
Boles et al.

[11] Patent Number: 5,019,899
[45] Date of Patent: May 28, 1991

[54] ELECTRONIC DATA ENCODING AND RECOGNITION SYSTEM

[75] Inventors: Glenn M. Boles, Fords; Gary W. Schober, Edison; Wen S. Chein, Piscataway; Chris P. Symanski, Union, all of N.J.; Philippe Des Rioux, New York, N.Y.; Walter Tomkoski, III, Jamesburg, N.J.

[73] Assignee: Control Data Corporation, South Minneapolis, Minn.

[21] Appl. No.: 265,831

[22] Filed: Nov. 1, 1988

[51] Int. Cl.⁵ .................... H04N 7/00; H04N 17/00
[52] U.S. Cl. ........................... 358/84; 379/92; 455/2; 358/139
[58] Field of Search .............. 358/84, 139; 455/2, 455/67; 379/92

[56] References Cited

U.S. PATENT DOCUMENTS

| 4,230,990 | 10/1980 | Ler, Jr. et al. | 358/84 X |
| 4,677,466 | 6/1987 | Lert, Jr. et al. | 358/84 |
| 4,739,398 | 4/1988 | Thomas et al. | 358/84 |
| 4,843,562 | 6/1989 | Kenyon et al. | 358/84 X |

OTHER PUBLICATIONS

"Television Video Recognition System Documentation" filed as prior art on Feb. 9, 1987 in U.S. Patent No. 4,739,398; printed by Rome Report, Inc. N.Y.

Primary Examiner—Jin F. Ng
Assistant Examiner—Wing F. Chan

[57] ABSTRACT

The disclosure relates to an apparatus and method for creating digital signatures from frames of selected video segments such as TV commercials by a digitizing, compression and selection process which produces a multi-digit signature from each frame. The signatures are stored in a memory database. In the recognition mode broadcast video transmissions are similarly digitized frame by frame to generate signatures which are then compared with the signatures in the database to find matches. The system cycles efficiently through the database testing for signature matches and then totalizing the signature matches to determine occurrences of a match between a transmitted segment or commercial and a stored segment or commercial. The system also includes signature generating and comparison circuits which permit wide variations in the quality of the input video signals form a variety of different media sources such as off-air, videotape or camera inputs while maintaining accurate recognition.

36 Claims, 25 Drawing Sheets

SYNCRONIZER
STATE DIAG. & TIMING

STATE TIMING DIAG.

FIG. 8 STATE TIMING DIAG.

DATABASE MODULE
MECHANICAL ANALOGY ized, com-
ELECTRONIC DATA ENCODING AND RECOGNITION SYSTEM

BACKGROUND OF THE INVENTION

For as long as television has been a commercially sponsored medium, advertisers of products have wanted to obtain information regarding time, market and frequency of broadcast. This information is often used to determine effectiveness of TV advertising or to validate content of signal transmissions. In order to maintain a high degree of accuracy this desired information has required until now manual collection by trained operators. Because of the enormous data contained within the video signal, approaches to electronic encoding of the video have presented limitations regarding practical storage capability and speeds of processing the incoming video.

Previous attempts to achieve automatic TV recognition were primarily designed to encode the audio component of the TV signal (see Lert, Jr. et al., U.S. Pat. No. 4,230,990 but rely on natural or synthetic media cues, e.g. . . . such as missing audio, increase in volume or highly compressed audio during passages of interest, broadcaster's fade to or from video black or "artificial" signals (such as inserted into the vertical blanking interval) by the TV station to trigger a time when to begin analyzing for a video passage of interest. Additionally, production effects or station changes to the video or audio signals (commercials or programming) differ from market to market and may violate copyright of the material. Media cues such as the broadcaster's program switches, or fades (such as to and from black) differ greatly from station to station and have been found reliable in only 90% of the time, at best.

Non-standard sources of video such as videotape or TV camera images are not suitable for systems developed to date, due to signal to synchronizing pulse instability.

Thus, this prior art provides no self-contained, efficient video apparatus or system for automatically monitoring or identifying passages of interest without modifying the TV signal, inserting media cues, or centrally-coordinating the databases of segments to deal with the problems described above.

Recently issued U.S. Pat. No. 4,739,398 of Thomas et al. entitled "Method and System for Recognizing Broadcast Segments", utilizes signatures derived from TV frames to recognize TV segments such as commercials. However, this system is relatively complex in its hardware and software, very expensive when compared to the invention described herein, and requires central comparison of collected signatures between several markets (using multiple samples) to provide accurate identification. The teaching of this patent has aspects which are useful in practicing the present invention and, to this extent, this patent is incorporated herein by reference.

SUMMARY OF THE INVENTION

The present invention provides improved method and apparatus for forming a database of commercials to be recognized against real-time TV transmissions and includes a first system for forming signatures or templates from recorded commercials by analyzing all the frames of the commercial in a novel and efficient manner and forming a signature therefrom made up of a relatively large number of bits. Selected signatures of the commercial are stored in the database to represent each commercial. When analyzing real-time TV transmissions to identify commercials which are previously stored into the database, signatures are formed for every single frame and each such signature is compared with every signature in the a database according to an efficient method by which signatures where are matched on one pass through the database are not checked on succeeding passes through the database. By this method, it is possible to recognize a real-time TV commercial before the commercial ends its transmission.

DESCRIPTION OF THE INVENTION

Figure 1:
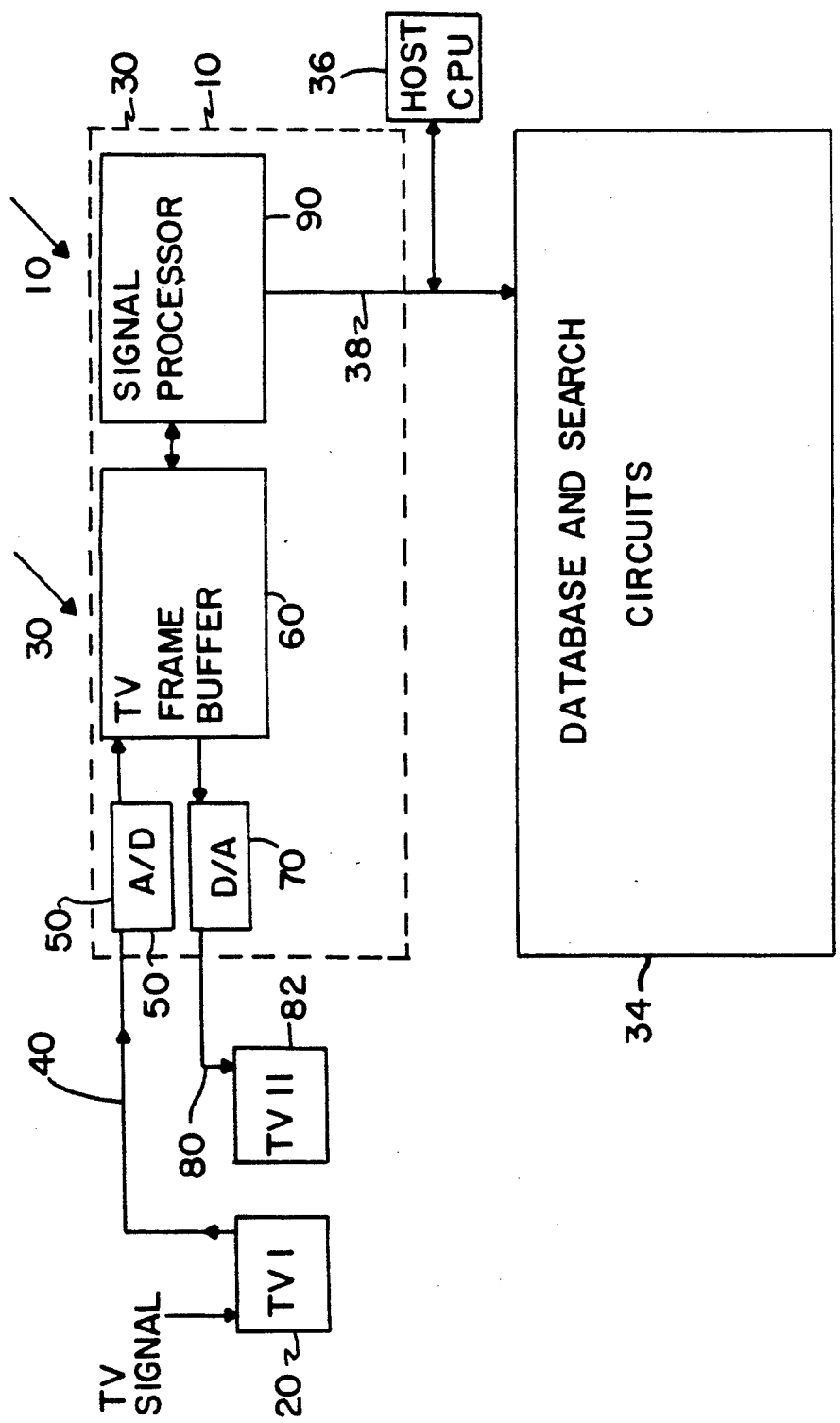
FIG. 1 is a schematic representation of the system of the invention.

The problems of recognition of speech or video are due to the enormous data mixed with noise that needs to be processed in real time when using template ("best fit") matching. In general the signals are digitized, compressed and stored in a database during the acquisition mode. During the recognition mode the incoming signals are matched to the stored information for identification. For video recognition with its large media data content, processing, speed and storage limitation mandate substantial data compacting and special use of a data base.

Digitized audio and video require much data to be correlated in real time; the data base needs to be fast and in the past has been done only with powerful computers. Adding to the difficulties are the reduction of the signal to noise ratio due to the different stages of storage, encoding transmission, reception, decoding and digitizing of audio or television signal. Therefore, pattern matching techniques are not simply a testing for equality, but rather a complex test for a "best fit" criterion, allowing for some errors.

If of instance, one were to consider a signature of 32 bits with a maximum of one bit in error from the "perfect" standard template, 33 tests would be required to investigate all the possible permutations of acceptable fit, the equality situation plus one for each bit in the 32 bit word. This course assumes a rather optimum entropy or coding efficiency. As the number of bits in difference between the test template and the master template contained within data base increases, the number of permutations increase substantially given by the equation:

$$p = n!/(n!-d!)*d!$$

where
p = number of permutations.
n = total number of bits.
d = number of bits in difference.
If we let n = 32 bits;

| BITS IN DIFFERENCE d | NUMBER OF PERMUTATIONS p |
| --- | --- |
| 0 | 1 |
| 1 | 33 (32 + 1) |
| 2 | 529 (496 + 33) |
| 3 | 5498 (4960 + 529) |
| 4 | 40920 (35960 + 5498) |
| 5 | 242296 (201376 + 40920) |
| 6 | 1148488 (906192 + 242296) |

Much experimentation and research was conducted by the applicants into the subject of the practical number of bits in variance from master templates. The variations were caused by different power levels at various TB transmitter markets, different TV tuners, varying synchronizing pulse stability, atmospheric conditions during the time of broadcast, as well as variations of the quality and signal handling equipment used at each TV station. The number of bits in variance on thirty-two bit signatures of the same video subject material was found to be between 0 and 6. Therefore, if one were to consider a system which employs 256,000 such 32-bit signatures with a tolerance to 6 bits in difference, the number of permutations would greatly exceed the entire signature database memory. Therefore classical associated (direct table driven look-up) database techniques would not be practical. Any software approach using a high-speed computer and ex-oring this test signature with the database signatures, followed by a shift of 32 bit times to count the number of bits in mismatch, would be far too slow to deal with 250,000 such signature within a single frame time of 33 milliseconds.

The invention disclosed herein is a unique database forming system and accelerator searching system eliminating the need for a super computer for real time video recognition. The "best fit" search of the database can tolerate error(s) not only for a particular frame but also in the sequence of a set of frames comprising an entire segment of video or commercial. No special sorting of the database is required for entry or up-keeping of the segment records since any data can be added or eliminated without affecting the other records.

The present invention is useful to perform a variety of electronic recognition functions, however, for purposes of illustration the following description of the invention is directed to the recognition of commercials in real time television broadcasts.

Briefly, the system of the invention operates by forming a library or database of commercials which can be searched with respect to a real time TV commercial being received at any time. The system is designed to monitor constantly, and without need for operator intervention. The library or database is prepared as follows:

1. Each pixel (pel) of each frame of a recorded commercial is digitized to form an 8-bit word representing the pixel's luminosity (8-bit quantization yields 256 possible levels) and each TV frame or digital words is stored in a frame memory (buffer)

2. Each frame of digitized pixels is arrayed into 64 super pixels, each super pixel being made-up of a group of 16×16 (256) pixels, the super pixel is simply an average of all 256 pixels.

3. The 64 super pixels per frame are compared with each other according to a pattern which produces a 32-bit signature word or template.

4. Selected signatures of each commercial are stored in a memory which is the database system.

The recognition process, briefly, comprises forming signatures of every frame of a real time video or other TV transmission, and comparing each such signature with the entire library (database) of stored signature to find matching signatures. When signatures are matched and a commercial is identified, the name of the commercial, the data and time, the broadcast channel and other pertinent desired data are presented.

The system of the invention 10 is shown schematically in simplified form in FIG. 1 and includes a signature generating portion 30 and a signature searching and comparing portion 34. It also includes a host computer 36 and an inter-coupling system bus 38. The signature generating portion 30 shown in FIG. 1 includes the usual TV antenna which couples a TV signal to a receiver 20. An output lead 40 from the TV receiver 20 is coupled to the signature generating portion 30 for generating a signature from each frame of the TV signal or from each frame of a recorded commercial in accordance with the invention.

In the module 30, the lead 40 is connected to an analog-to-digital converter 50 which digitizes each pixel of each frame of the signal into an 8 bit digital word representative of the pixel's luminosities and these digital words are sorted in a TV frame buffer or memory 60. The memory 60 is coupled to a digital-to-analog converter 70 which reconverts each digital word back into an analog signal and the original TV signal is reconstituted and viewed on a monitor 80. The monitor confirms the efficiency of the digitizing process and the processed video output can be evaluated.

The TV frame buffer 60 is also coupled to a digital signal processor (SSP) module 90 which, in conjunction with the system software and other circuits processes each digitized frame to form a digital signature as described briefly above. These signatures are used to form a database located in the system portion 34 against which real time TV signal signatures are searched and compared in a manner to be described.

Figure 2:
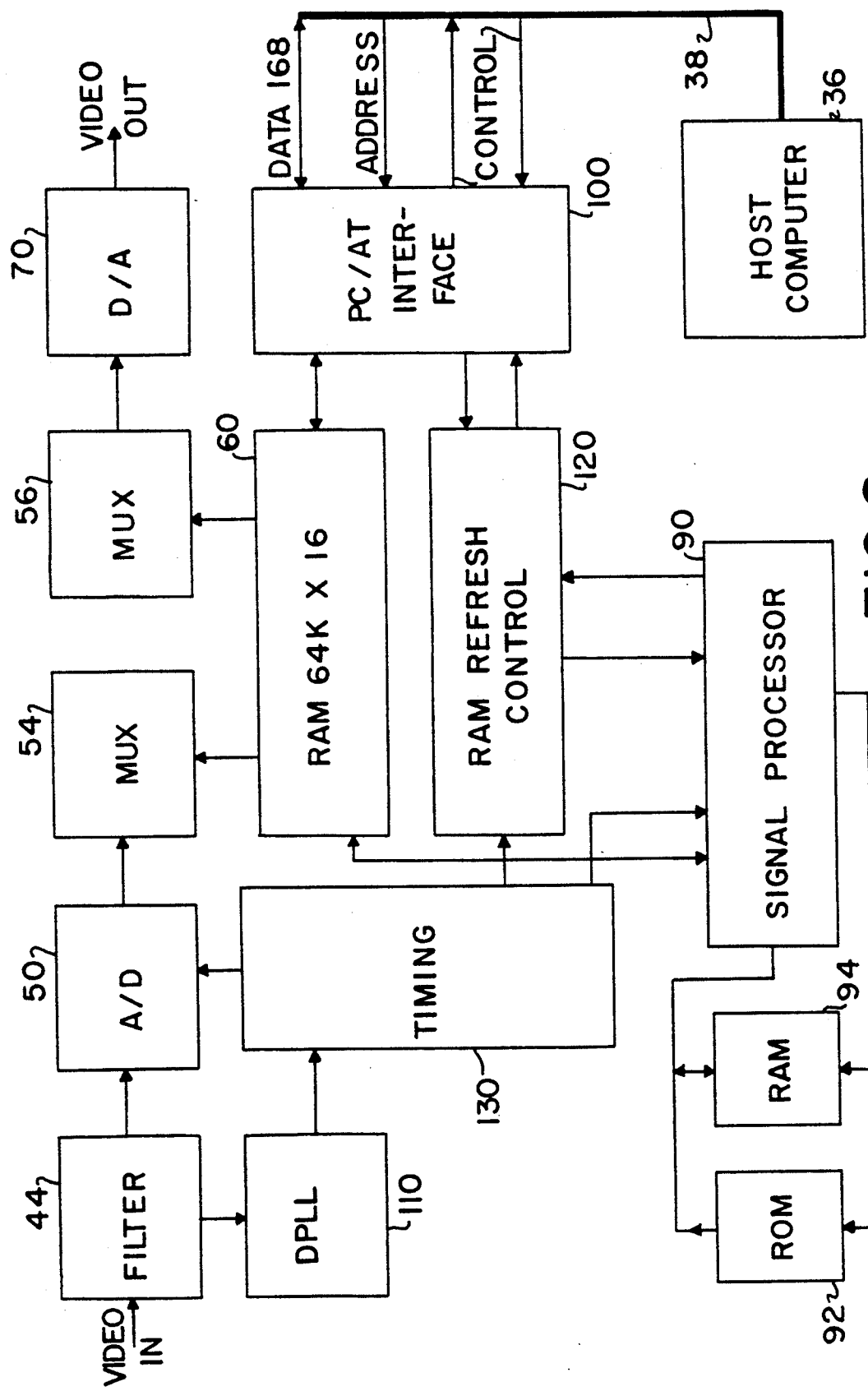
FIG. 2 is a more detailed schematic representation of the system of invention.
Figure 3:
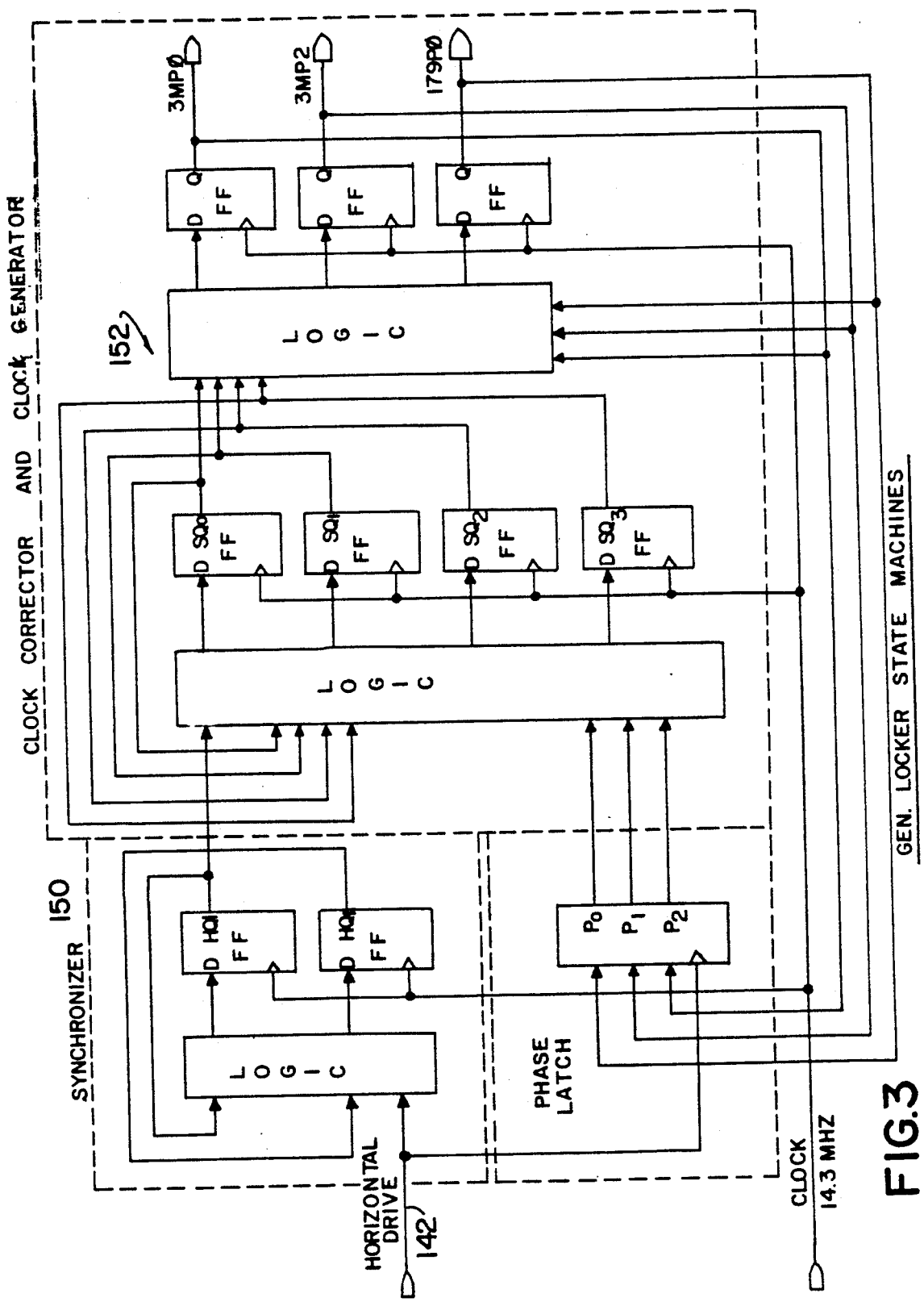
FIG. 3 is a schematic representation of a logic circuit providing TV frame phase control timing in the system of FIG. 2.
Figure 4:
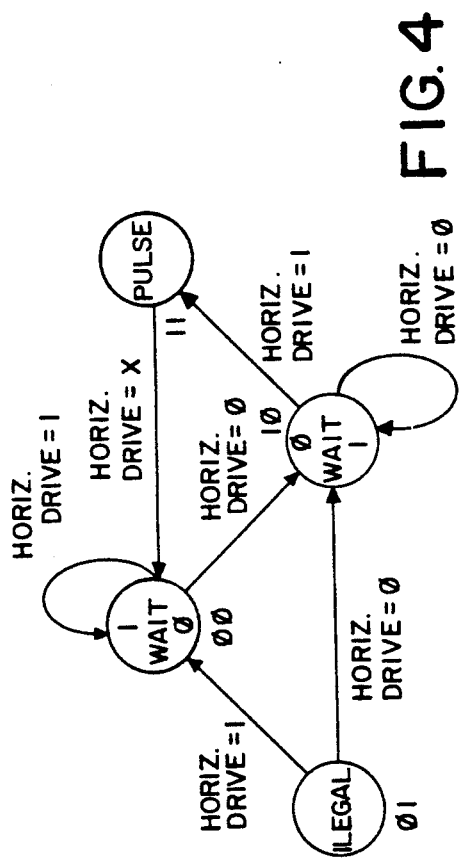
FIG. 4 is a logic diagram illustrating the operation of the circuit of FIG. 3.
Figure 5:
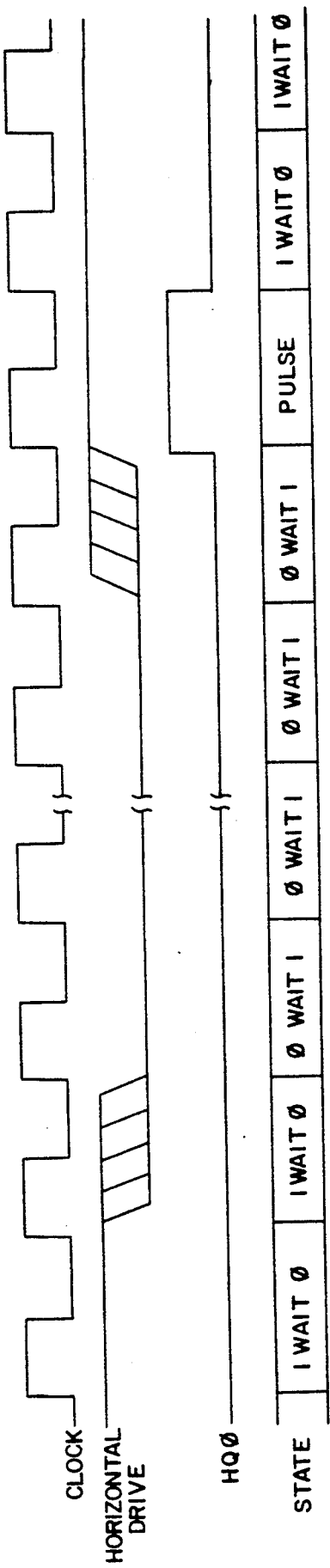
FIG. 5 is the timing output from the timing module of FIG. 3.
Figure 6:
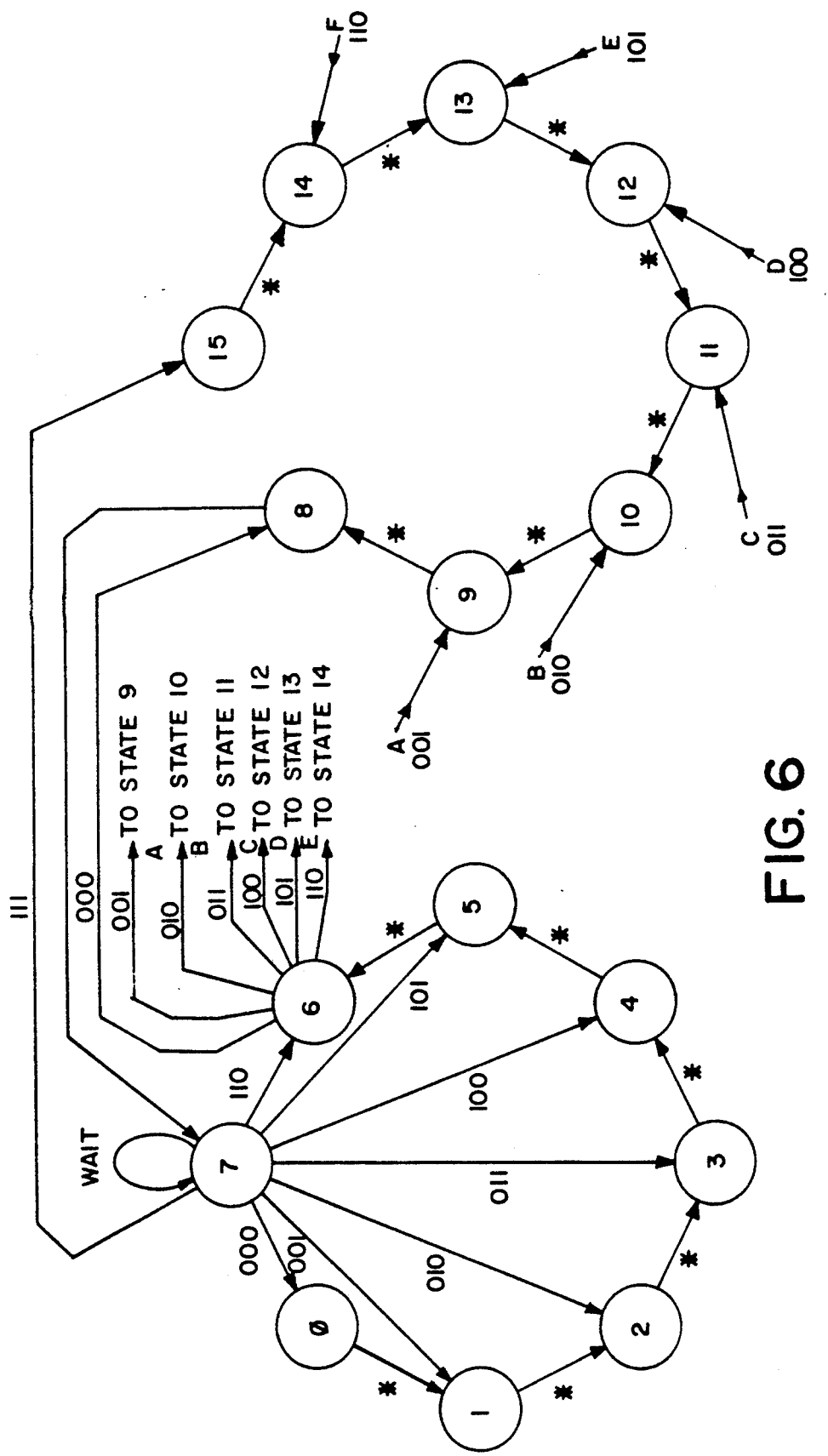
FIG. 6 is a model of the sequence flow which takes place in clock correction with the circuit of FIG. 3.
Figure 7:
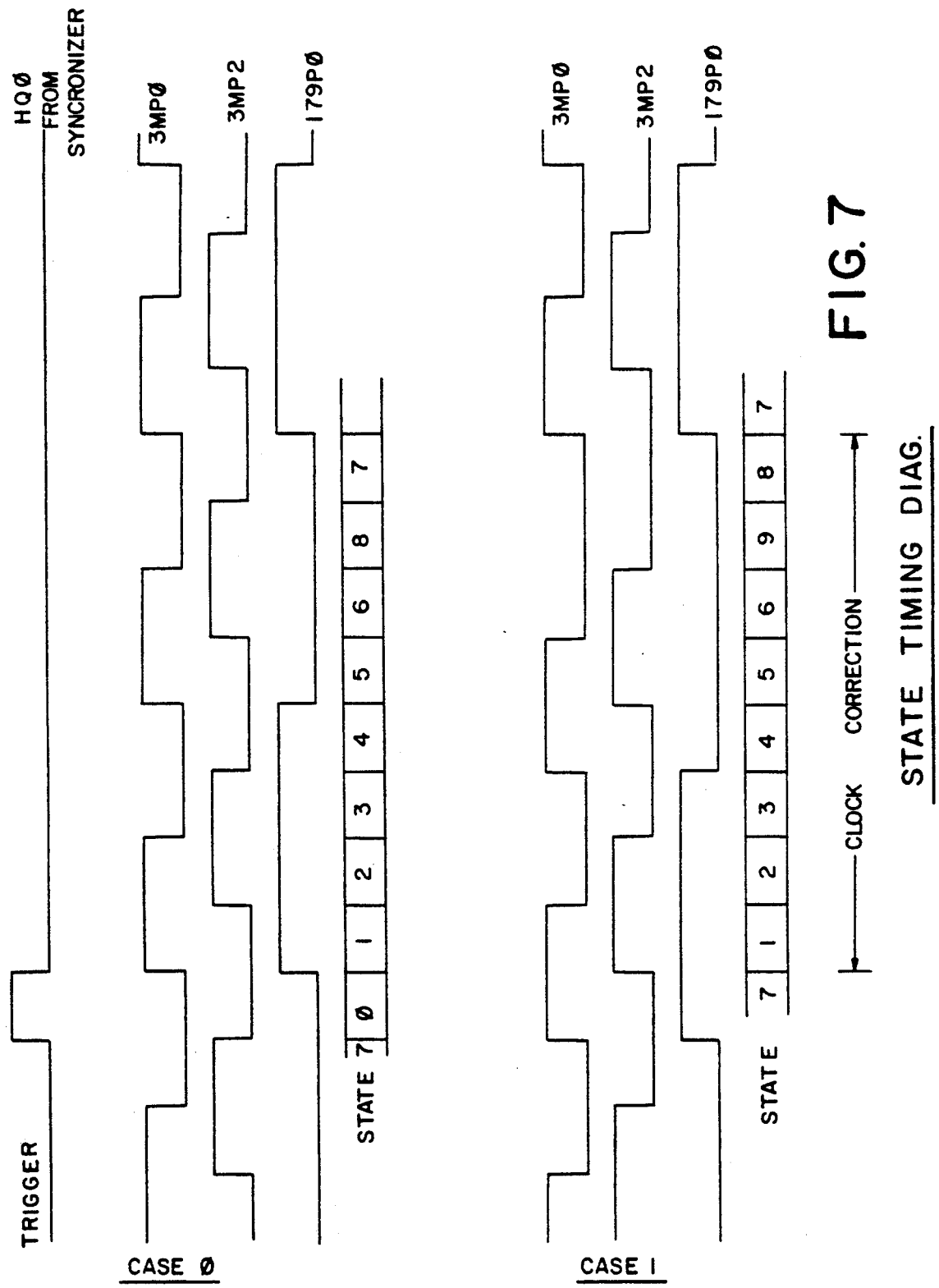
FIG. 7-10 illustrate eight possible examples of clock corrections carried out by circuit of FIG 3.
Figure 8:
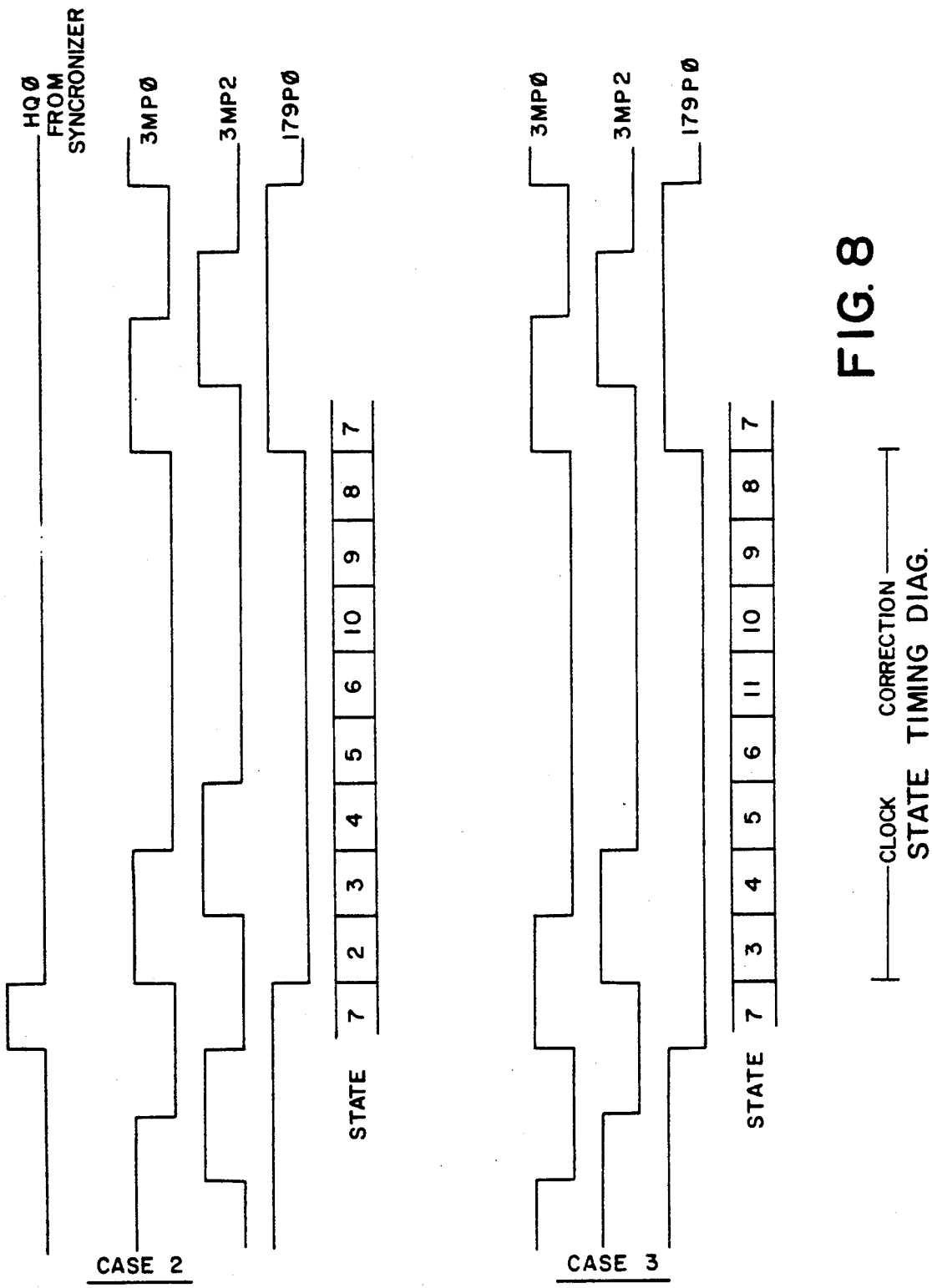
Figure 9:
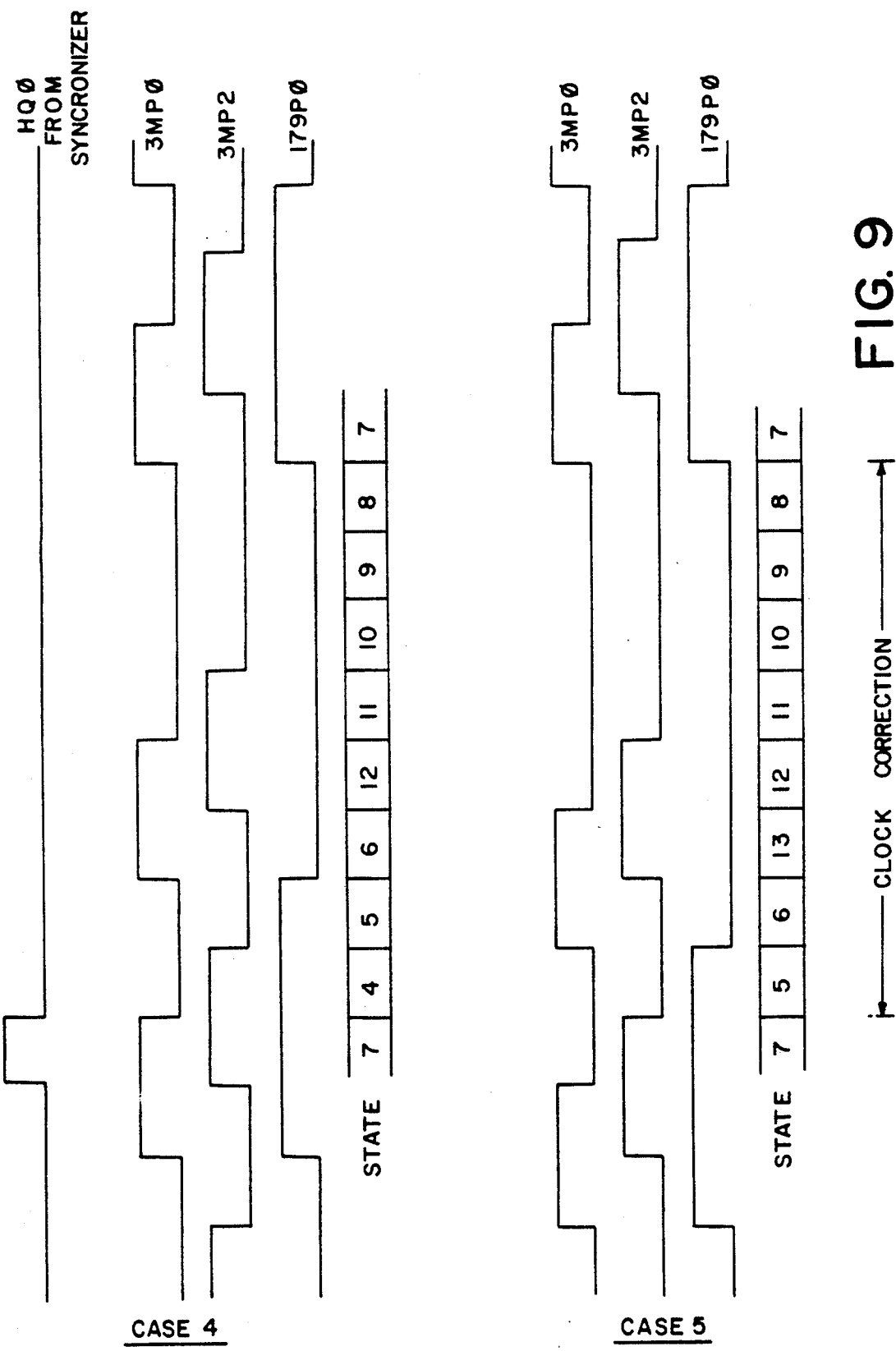
Figure 10:
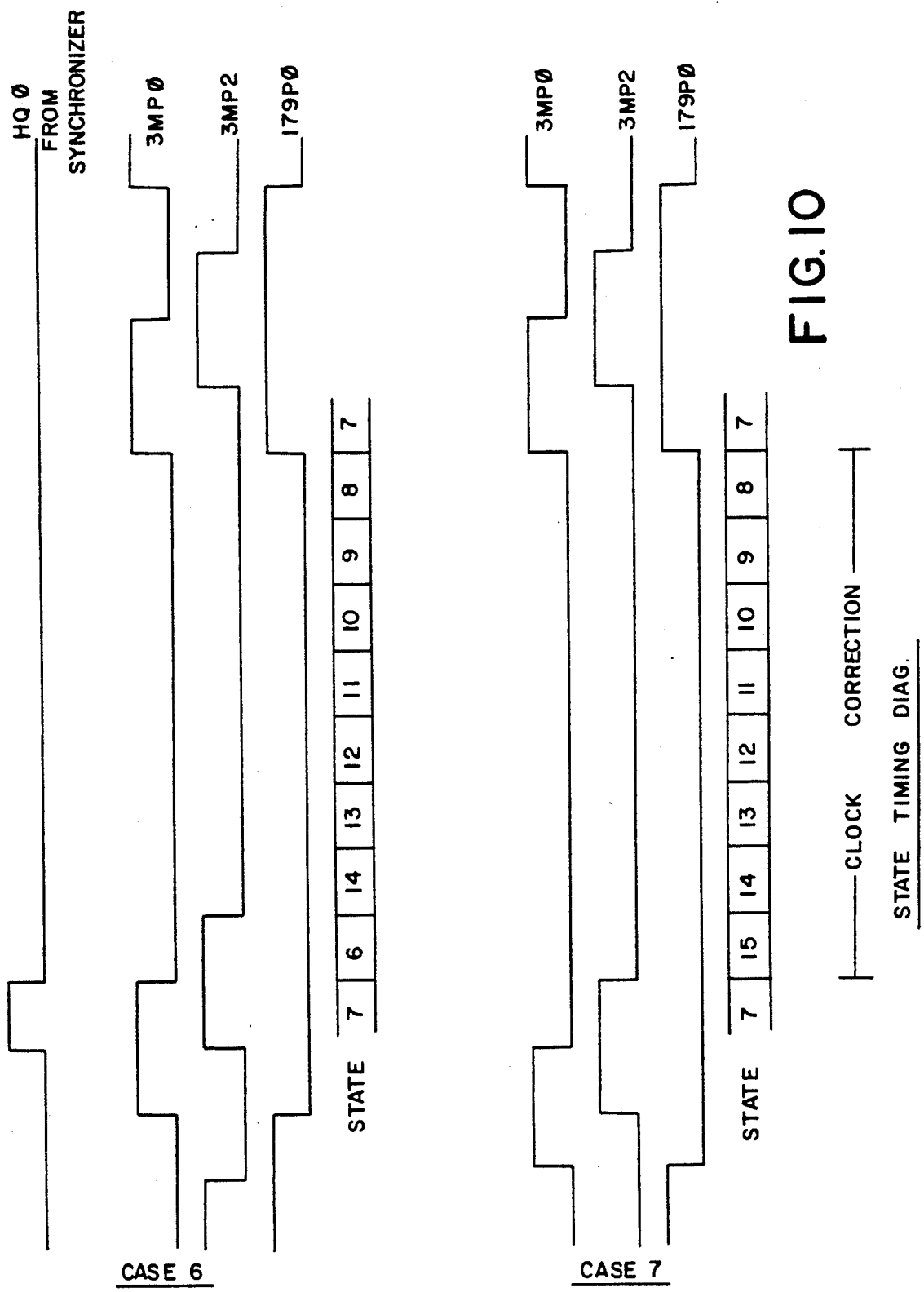

The system of the invention 10 is shown in greater detail in FIG. 2 which shows the input TV signal or recorded commercial coupled through a low pass filter 44 which is chosen at the Nyquist bandwidth of 1.8 MHz and this filtered video is then fed to the analog-to-digital converter 50 which converts each pixel of the picture into an 8-bit word representative of the luminance of each pixel. Video black is represented by eight "0" bits and video white is represented by eight "1" bits. Each 8-bit word generated by the converter 50 is fed through a multiplexer 54 into the TV frame buffer or random access memory (RAM) 60 where it is stored. The digitizing rate is 3.58 million samples per second The RAM 60 is also coupled to the signal processor circuit 90 which is a TMS 32020 Digital Signal Processor (DSP) manufactured by Texas Instruments. A read only memory (ROM) 92 which contains the basic input/output operating programs for generating signatures is coupled to the processor 90 and another random access memory (RAM) 94 is also coupled to the processor 90. ROM 90 and RAM 92 are interconnected for operation together and are used by the DSP module 90 for program and data space.

The signature generating portion 30 includes an interface 100 which is coupled to the host computer 36 by way of the system bus 38. It is noted that the host computer may be a relatively simple IBM PC/AT or any other suitable computer.

The system shown in FIG. 2 includes a timing control circuit 130 with includes a sophisticated digital phase lock loop circuit 110. The timing circuit is connected to a RAM refresh control circuit 120 which operates with the digital signal processor 90 and memory buffer 60 in the process of generating signatures. Refresh circuit 120 is also connected to the interface 100.

The timing circuit 130 serves to set the system clocks so that when digitized 8-bit words are stored in memory 60, the storage process starts at the desired location in the memory corresponding to the upper left hand corner of a frame.

The timing control to achieved as follows, referring to FIG. 3 through 11. The incoming signal applied to the analog-to-digital converter 50 is also presented to the timing circuit 130 to extract timing information relating to the coincidence of horizontal and vertical pulses. The sync information is used to provide a reference to the digital phase lock loop circuits 110 (also contained in circuits 130) and coordinate the writing and reading of the frame buffer information and accessing of this data by the host computer as well as the signal processor 90 and its associated circuits.

The digital phase locked loop 110 and timing circuit 130 are designed according to the following criteria:

1. They are gen-locked to the input video source that is, synchronized to Horizontal & Vertical video synchronizing pulses.

2. They are tolerant to variation in video synchronization signals usually seen in inexpensive VHS VCR's operating in the 6 hour mode.

3. They require no adjustments for frequency control.

4. They maintain proper symmetry of clock cycles to avoid corrupted frame buffer memory access cycles resulting in defective read or write memory data.

The module 110 comprises two synchronous state machines 140 and 150 and a phase latch 160. The design of theses state machines utilize techniques well known in the art of logic design and are built into commercially available programmable logic devices (PLD's).

The first state machine, the synchronizer 140 takes as its input the Horizontal Drive from the analog sync separator on lead 142 and generates a pulse one clock cycle in duration at a time coincident to the Horizontal Sync signal. This pulse occurs once per Horizontal Line and is used as a trigger to the second state machine 150.

The phase latch 160 records the current state or phase of the clocks on the transition of the Horizontal Drive.

A potential problem of shortened clock cycles exists due to the 3.58 MHz sampling frequency chosen to digitize the analog video signal. This sampling frequency yields a non-integer number of samples per Horizontal the line that is 227.5 samples per line. The state machine 152 resolves this problem and locks to the incoming video to within $+/-\frac{1}{4}$ pixel.

Knowing the phase of the clock along with the trigger from module 150, the second state machine 152 can rephase all the clocks as necessary to guarantee a fixed phase relationship of these clocks within eight cycles of the oscillator without any shortened of aborted clock cycles. Eight cases of clock corrections are possible and are shown in the STATE DIAGRAM of FIG. 6 and the STATE TIMING DIAGRAM of FIG. 7 through FIG. 10.

Figure 11:
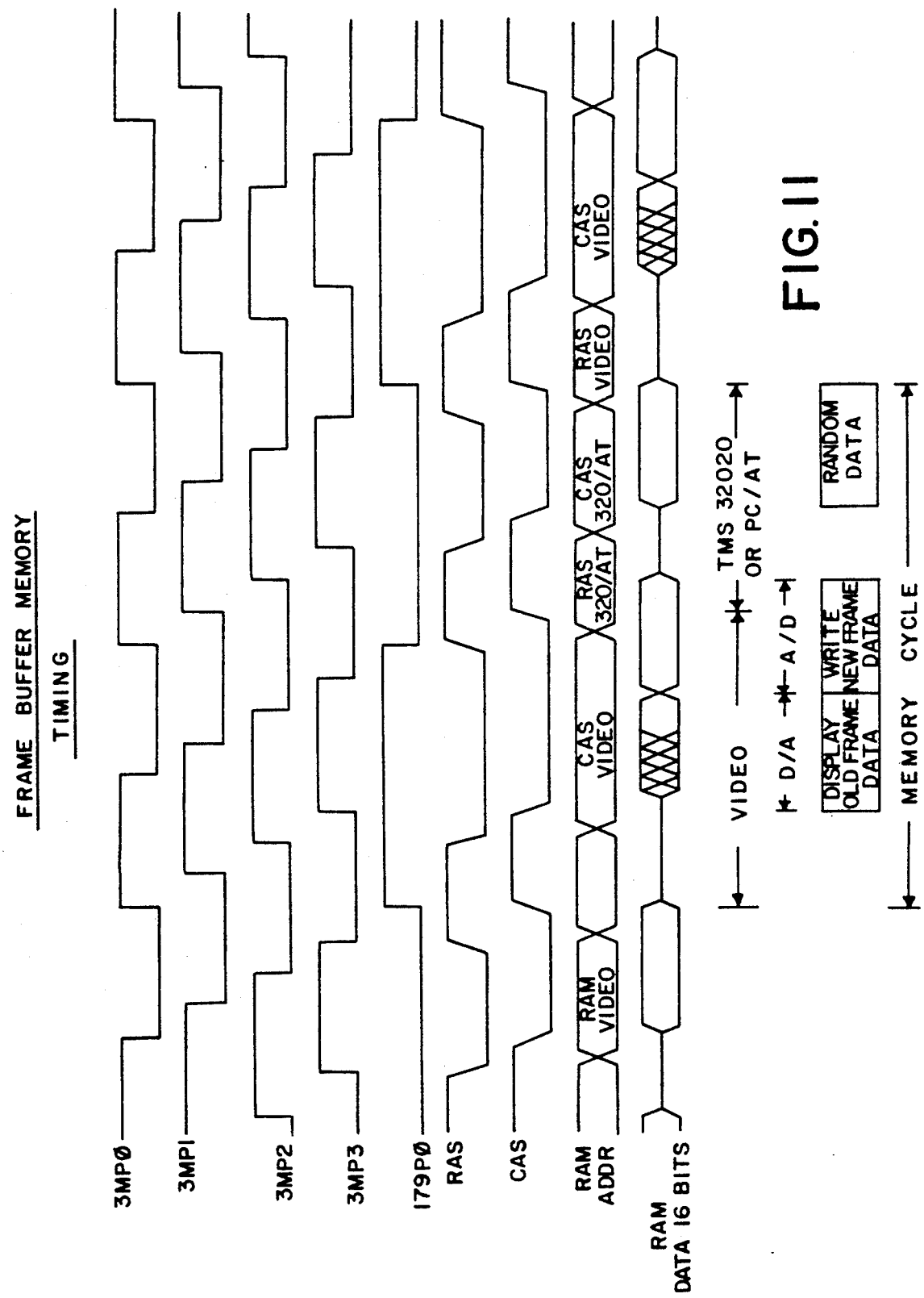
FIG. 11 is a timing diagram showing the overall operation of the timing apparatus of the system of invention.
Figure 12:
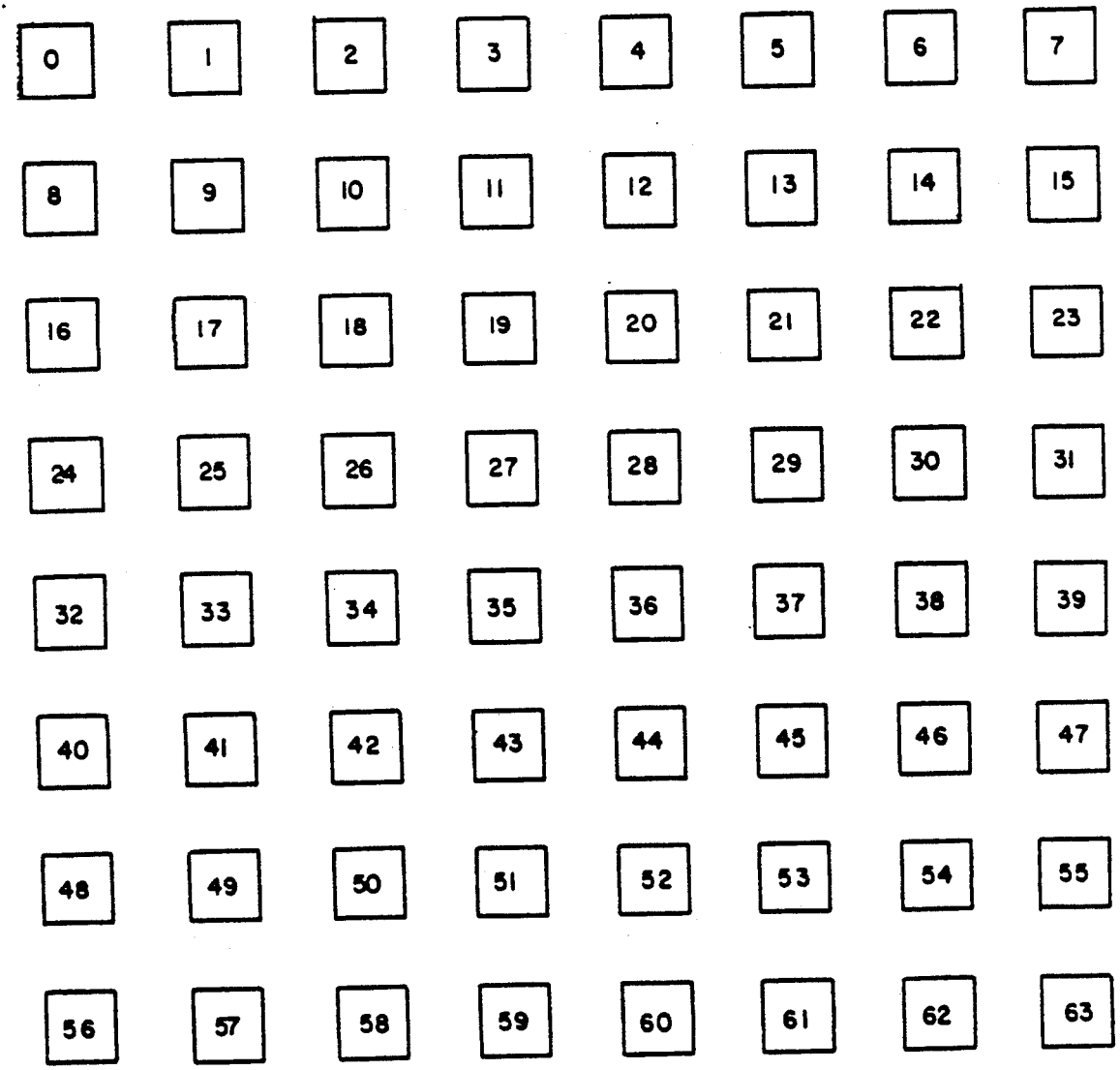
FIG. 12 is a schematic representation of a frame of a TV picture (recorded or real time) and the pattern of pixels formed therein during the process of forming signatures therefrom.

FIG. 11 is a detailed timing diagram of the acquisition circuits and frame buffer. It depicts the 4 phases of clock timing to (1) display a pixel from a previous frame; (2) write a new pixel from the current TV frame; (3) read or write data to/from the TMS Digital Signal Processor (DSP); and (4) access the frame memory (buffer) to/from the PC/AT host computer.

Referring to the system shown in FIG. 2, in the process of generating signatures, first the program is transferred from the computer 36 to the RAM 9 through interface 100. The input video (either TV commercials or segments of interest) is fed through a Nyquist (1.79 MHz) filter 40 and then to the Analog to Digital Converter (A/D converter). The converter 50 processes the video signal and converts it to discrete pixels (at 3.58 megasamples/second) for each TV frame as 8-bit words, each word having one of 256 possible luminance levels. Each 8-bit word is then stored into frame memory 60 as corresponding fields of digital words. The visual resolution of the memory 60 is 185 pixels across each horizontal line, and there are 242 such horizontal lines per TV field.

This yields 44,770 pixels for the entire field. As noted above, the unique tri-ported timing system 130 and 110 insure proper location of the frame of pixels into the memory 60.

As detailed above with respect to FIG. 1, the same digital information is fed to the Digital to Analog (D/A) converter 70 and is reprocessed for confirmation monitoring of the test video via video monitor 82.

Under the control of the system software in RAM 94 and the system hardware, the digital information stored in the memory 60 is processed frame by frame as follows. First, each frame is assembled into 64 areas, each area being the average of 16×16 (256 total) pixels, called super pixels. Each super pixel is separated by four pixels to prevent overlapping. The averaged pixels making-up each super pixel area have a unique (geometric) position on the screen and are chosen to fall within 70% of the most active part of the screen. The averaging process is used to reduce the adverse effects of noise and subtle video variations commonly found between different broadcaster, while compressing the visual data by a factor of 2800 to 1. Use of this averaging process is critical for preserving the robustness of the signature.

Next, the software in the processor 90 and RAM 94 compare super pixels (pels) in a pattern and order shown below. The comparing pattern and order being determined as the result of empirical studies of many TV frames of commercials, which studies were designed to compute the most repeatable and yet diverse set of number (signatures) to be representative of the significant portions of a TV picture.

| The order of bit | super pel# | vs. | super pel# |
|---|---|---|---|
| 01 | 09 | | 37 |
| 02 | 45 | | 24 |
| 03 | 43 | | 03 |
| 04 | 02 | | 44 |
| 05 | 16 | | 52 |
| 06 | 34 | | 04 |
| 07 | 40 | | 60 |
| 08 | 47 | | 58 |
| 09 | 31 | | 53 |
| 10 | 08 | | 51 |
| 11 | 39 | | 50 |
| 12 | 41 | | 13 |
| 13 | 42 | | 14 |
| 14 | 29 | | 17 |
| 15 | 23 | | 59 |
| 16 | 55 | | 61 |
| 17 | 36 | | 10 |
| 18 | 21 | | 25 |
| 19 | 22 | | 33 |
| 20 | 57 | | 46 |
| 21 | 56 | | 54 |
| 22 | 49 | | 30 |
| 23 | 27 | | 05 |
| 24 | 38 | | 32 |
| 25 | 62 | | 48 |
| 26 | 35 | | 18 |
| 27 | 28 | | 11 |
| 28 | 26 | | 12 |
| 29 | 01 | | 20 |
| 30 | 63 | | 15 |
| 31 | 19 | | 06 |
| 32 | 07 | | 00 |

There are thus 32 such comparisons of pels and each comparison produces a "1" bit or a "0" bit depending on whether the first pel is larger in value than the second, or the second is larger than the first. This coding of the video signal in accordance with the relative differences in luminosity provides immunity to all picture level variations since all of the composite video signal is subjected to the same transmitted and received variation rather than just certain parts of the picture signal. Each 32-bit word thus formed by the foregoing process is the signature of the TV frame, containing a terse description of the relative luminance (brightness and darkness areas) and geometric position of same.

As the digital signatures are formed from each frame of the commercials to be stored in the database, these frames are first stored into the host computer 36. With the aid of software, the host computer selects eight of the most significant signatures for storage into the database. The eight signatures are considered "three-dimension encoded" because they represent salient portions of frames (both horizontal and vertical elements of the picture) making-up the commercial, but also the order in which they were selected is preserved by installation into the database. The choosing criteria for the eight signatures to be installed into the database in such that they represent bold differences between segments of video, remain over a number consecutive frames, and are interspaced such that they identify the beginning, middle and end of a commercial. These signatures then along with the name of the commercial, transmission channel, time of capture and other desired data are entered as a record in the database file on the host computer.

Once the entire database of TV commercial signature has been created, the system is ready to receive real-time live broadcast or taped TV signals, form a signature, and analyze these signatures to detect commercials therein. In analyzing real time TV commercials, every frame of the received picture is processed in the manner described above to generate 32-bit signatures from each frame, and each such signature is compared with all relevant signatures contained within the real-time database memory on the database accelerator circuits.

Figure 13:
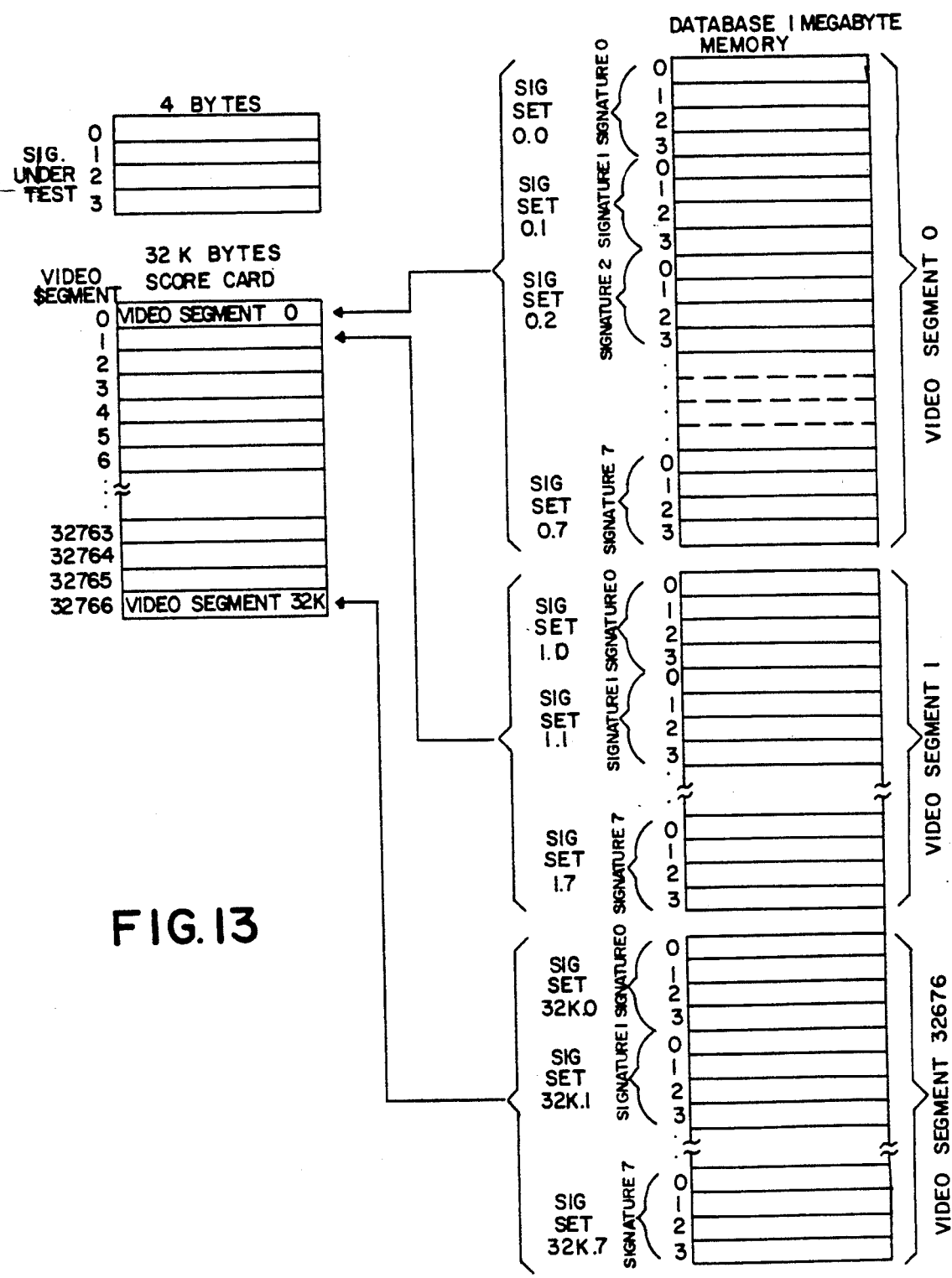
FIG. 13 is a schematic representation of a database and the storage of commercial signatures therein and the relationship of the database to the score card module.

The digital signatures or "templates" generated from commercials and to be identified are stored in the database 170 as illustrated schematically in FIG. 13. in the database, the signatures are called scenes. Each 32-bit signature is stored in four 8-bit units or bytes, and there are eight such signatures or scenes stored to represent each commercial. It should be noted that, unique to the database comparison process, the commercials need not be stored in any particular order for the recognition process to operate properly since a commercial in recognized by its visual content as represented by unique signatures and not simply by a pre-ordered commercial position is the memory. The total database, in one system, contains 32,768 possible commercial entries or 250,000 signatures of 32 bits each.

Each commercial or video segment in the database has a corresponding memory byte in the score card RAM 400 and score card module 210 as represented in FIG. 13.

The database 170 can be accessed by the host computer 36 on system bus 38 for the purpose of adding commercial signatures or deleting commercial signatures.

Figure 14:
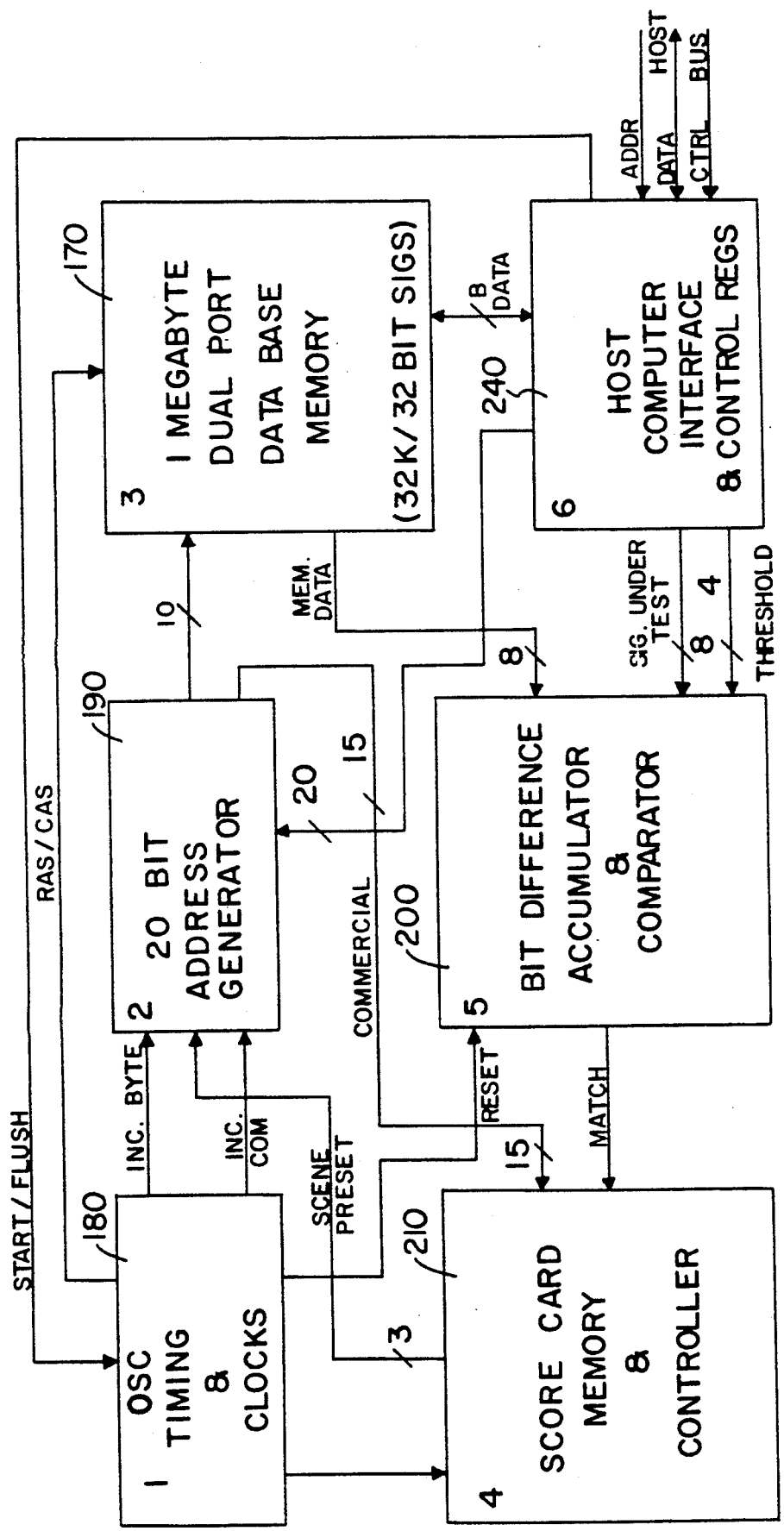
FIG. 14 is a general block diagram of the system for carrying out the signature comparing process.

The portion 34 of the system 10 of the invention for comparing signatures generated from real time TV transmissions within the database is shown in the most general terms in FIG. 14. The system 34 shown in FIG. 14 includes a master oscillator timing and clock circuit 180 coupled to all pertinent parts of the system. A 20-bit address generator 190 is coupled to the database memory 170 for addressing all possible signatures contained therein. The host computer 36 is coupled by bus 38 through an interface 240 to the database memory 170 and to the address generator and to a bit difference accumulator and comparator module 200. The bit difference accumulator 200 is coupled to a scorecard memory and controller module 210.

The system of the invention shown in FIG. 14 is shown in greater detail in FIGS. 15 through 21. Referring first to the oscillator and timing module 180, this module includes a crystal controlled oscillator 182 coupled to a clock generator and sequencer 184 which are suitably coupled to all of the pertinent parts of the associated system to provide both pipelined and synchronous operation. Oscillator circuit 180 provides master timing for the system and uses a timing signal at typically 24 MHz although other frequencies could be used. The clock generator and sequence counter circuit 184 can sequence the address generator 190 to properly sequence through the addresses in the database 170 under the control of information derived from each comparison between a generated signature and a database signature.

The module 184 includes the following leads:

1. An output RAS signal bus 510 which joins lead 172 into the database memory and; an output CAS signal bus 512 which joins lead 174 into the database. These are row (RAS) and column (CAS) DRAM control signal buses;

2. An output bus 514 to clock throughout the system;

3. A GO41T signal bus 516 from the host command register which is in this module which initiates a database scan cycle 4. An increment byte signal bus 516 which goes to the byte counter 196 in the address generator 190 to be described, to advance the byte pointer;

5. A reset byte bus 520 which goes to the same byte counter, 196;

6. An increase scene bus 522 to the scene pointer 194 in the address generator which advances the scene pointer;

7. A load scene bus 524 which goes to counter 196 in the address generator, to select a pair of scene signatures;

8. An increase commercial signal bus 528 which goes to commercial counter 192 in the address generator 190; and;

9. A reset signal bus 526 which goes to the bit difference accumulator 200.

Figure 15A:
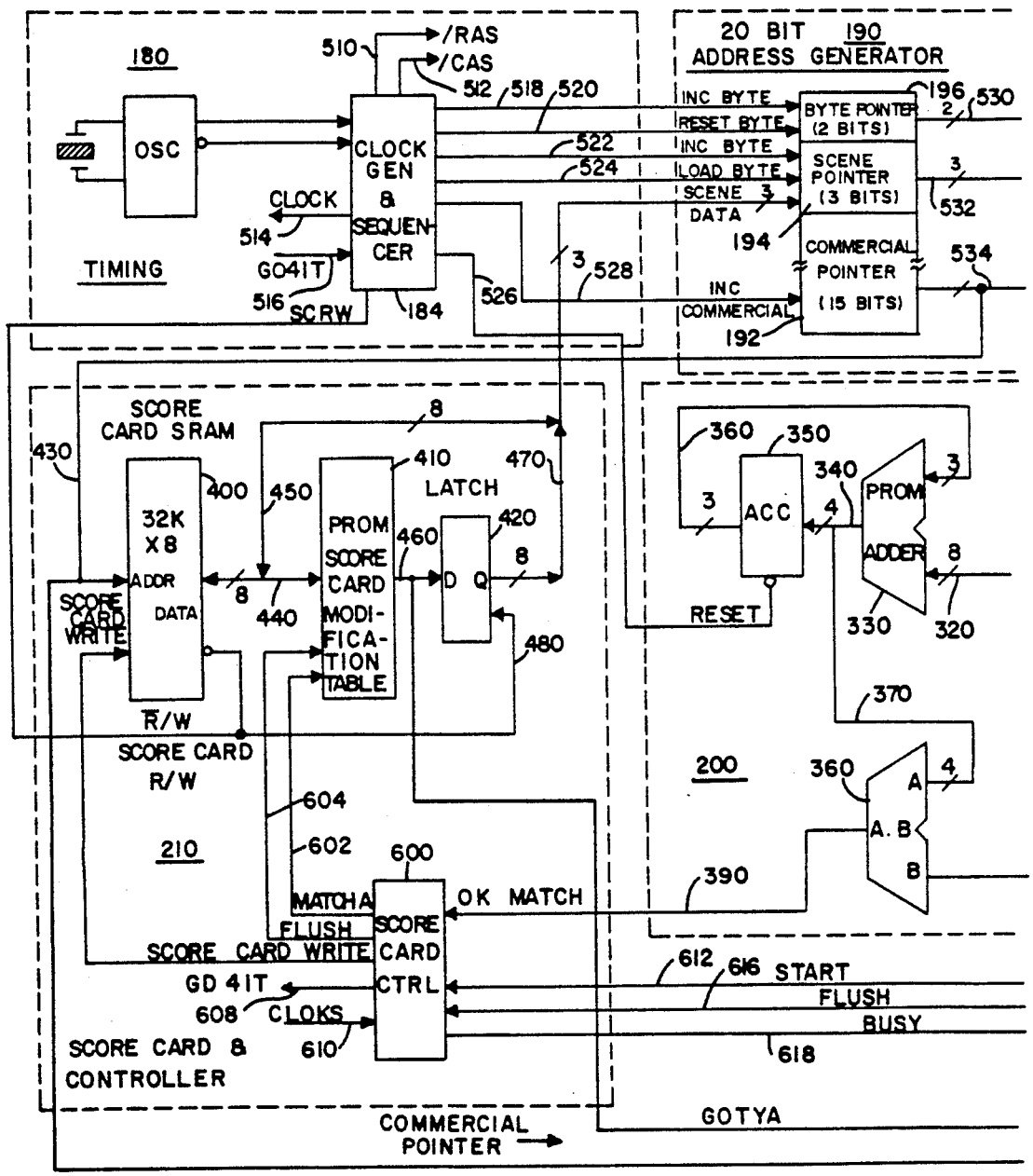
FIGS. 15A and 15B are a more detailed block of the system of FIG. 14.
Figure 15:
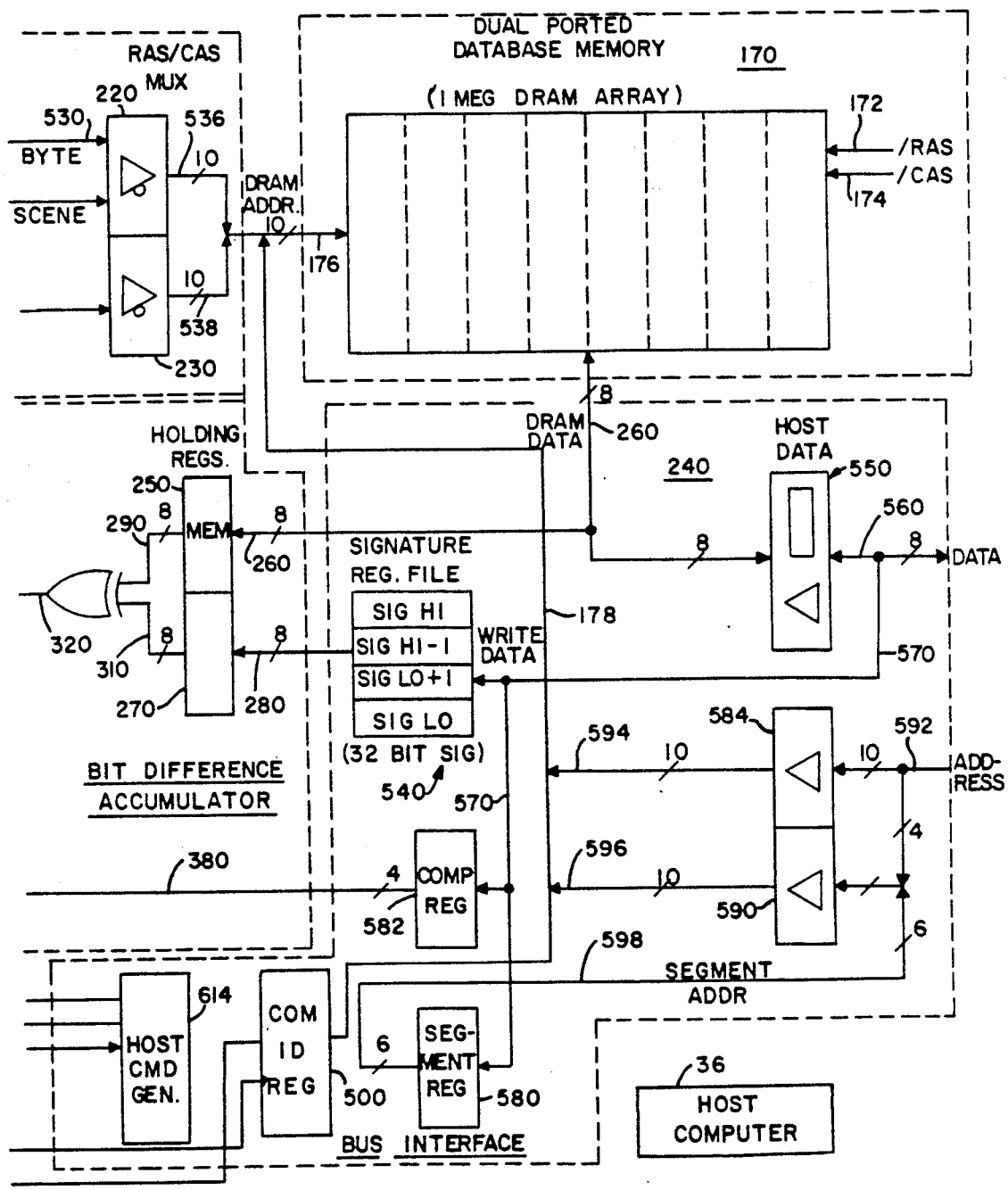
Figure 17:
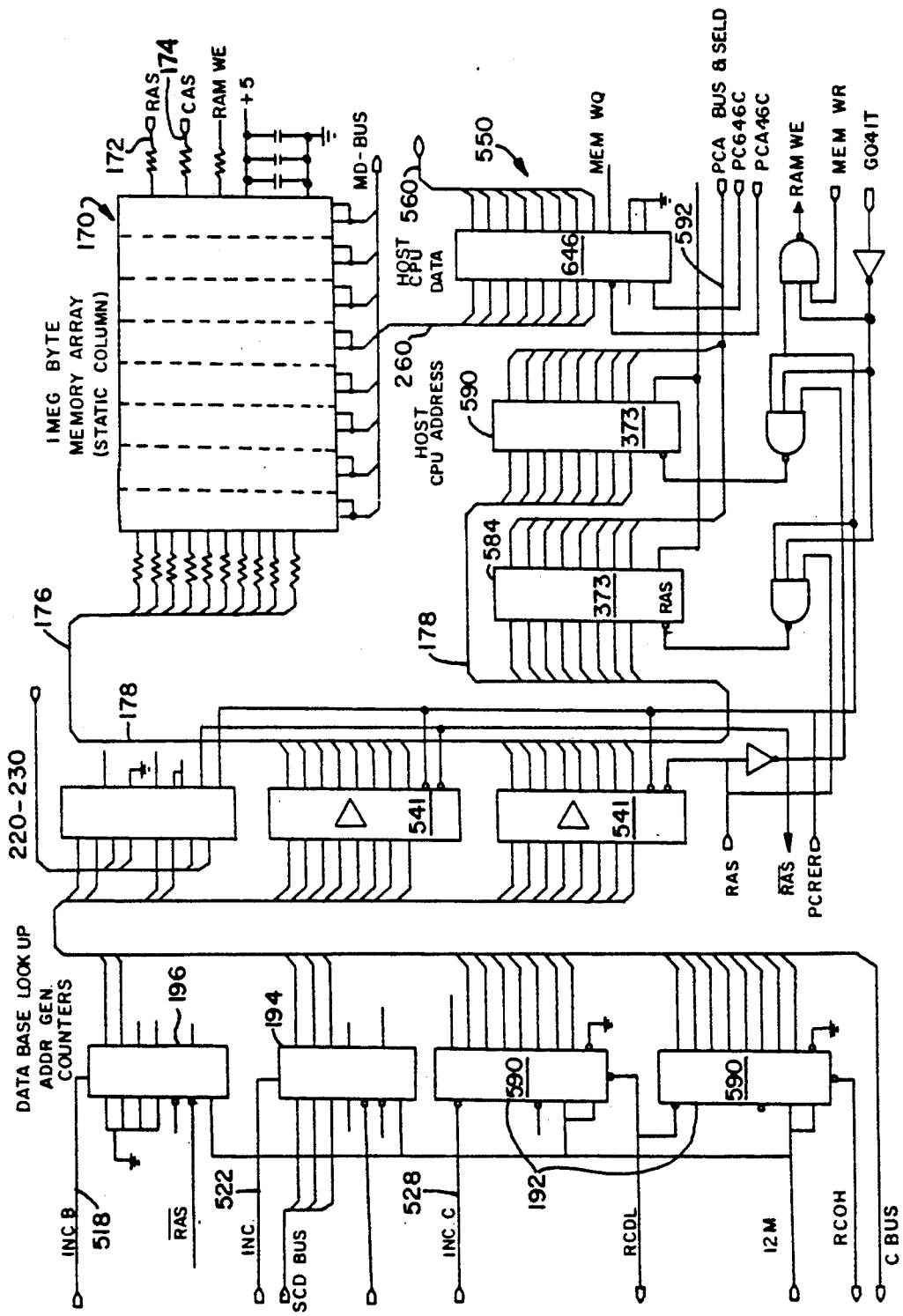
FIG. 17 is a more detailed schematic diagram of the address generator of FIG. 15.
Figure 18:
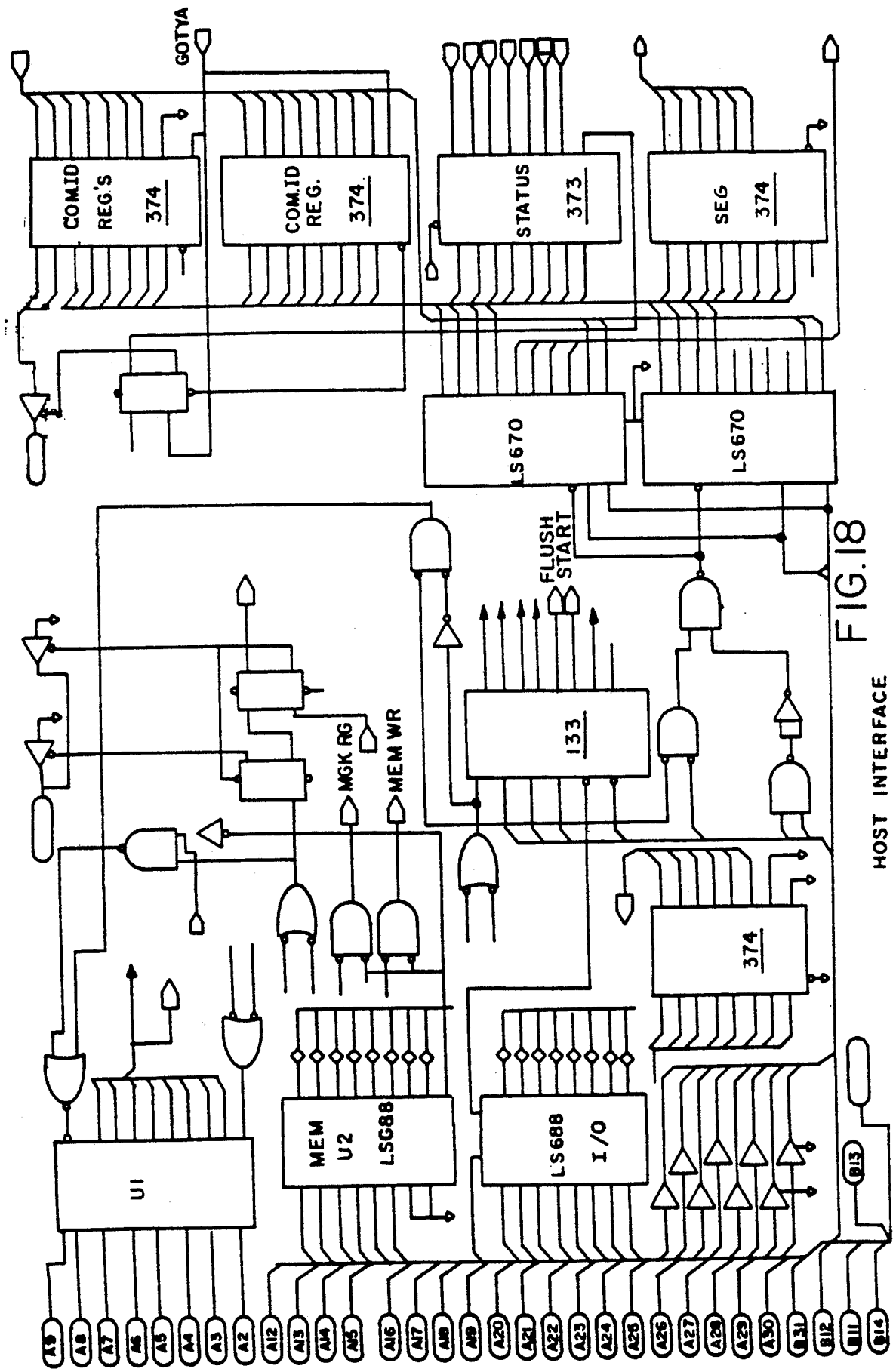
FIG. 18 is a more detailed schematic diagram of the hose interface.

Referring now to the address generator 190, this is a 20-bit device, as illustrated in FIGS. 15 and 17 and is made up of standard types of synchronous binary counters. The address generator also includes novel means for providing refresh pulses for the dynamic RAMS in the database while maintaining synchronous address generation for the memory read/write circuits.

Addresses of 20 bits for the database memory, which is a 1 megabyte memory array, are generated by three sets of counters. The high order counter 192 provides 15 bits out of the 20 address bits and is used to select up to 32,768 signature clusters or commercials. This counter is also coupled by bus 534 and address bus 430 to the score card ram to be described. Bus 534 is connected to a multiplexer 230. The second order counter 194 generates 3 of the 20 bits and is used to select 1 of the 8 signatures within a commercial or scene selector and is coupled by bus 532 to multiplexer 220. This counter is preset at the beginning of each memory subcycle on bus 470 with data contained in the scorecard module 210 as described in detail below. This data determines which signature (scene) pair to use in the comparison process. The low order counter 196 generates the 2 bits needed for byte addressing of the 4 bytes (or 32 bit signature) and is connected by bus 530 to multiplexer 220. Multiplexers 220 and 230 are connected by 10-bit buses 536 and 538 respectively, to DRAM address bus 176 into the database. The multiplexer circuits 220 and 230 are tri-state buffer circuits.

The output address lines from the address generator 190 include:

1. A 2-bit output bus 530 which runs from the byte pointer counter 196 to the module 220 which is a tri-state buffer circuit used as a multiplexer;

2. A 3-bit scene output bus 532 which runs from the scene pointer counter 194 to buffer module 220;

3. A 15-bit commercial output bus 534 which runs from the commercial pointer counter 192 to a module 230 which is also a tri-state buffer multiplexing circuit and to the score card module 210 which is used to address the respective scorecard byte for that commercial. 3-bits of the selected scorecard byte supply the preset data for scene counter mentioned above; and;

4. A 3-bit scene data bus 470 which comes from the scorecard ram. This data defines the first signature of a pair of signature of the 8 scenes signatures for a particular commercial should be used for the comparison process. This data is preset into the scene counter when the load scene signal is applied.

The 10-bit output buses 536 and 538 from the buffer circuits 220 and 230 supply the 20 bit memory address in two parts, to the first 10 bits being the memory row address and the second 10 bits the memory column address.

The DRAM address bus 176 from the address generator 190 and a DRAM data bus 260 from the host data module in the interface 240 and bus 178 from commercial ID register module 500 are interconnected as shown.

These output lines from the address generator are coupled to the dual-ported DRAM memory array 170 (which is the system database), through the tri-state buffer circuits 220 and 230 via the 10-bit address bus 176. These buffers allow initial up-loading of signatures into the database from the host computer 36. This data up-loaded into the database is fed through the bus interface 240 on data bus 560 through module 550 and bus 260.

The interface 240 shown in FIG. 15 also contains input/output decoder circuits to provide means for the host computer to send and receive commands to and from the signature comparing circuitry. The interface 240 also includes a signature register file 540 which holds the 4 bytes of the signature under test originally calculated by the system of the invention, and shown in FIG. 2. The register file allows the signature under test to be examined one byte at a time, later, during the entire comparison process. The interface also has a host data module 550 which permits the host to be able to initialize or modify the data within the database and is connected by DRAM data bus 260 to the database memory array.

The host data module 550 also has a bus 570 to the signature register file 540 and to the segment register 580 and to the comparator or threshold register file 582. The interface also has two modules 584 and 590 which are used to buffer and receive addresses from bus 592 which has 10-bit outputs presented on buses 594 and 596 connected to the bus 178. A segment address 596 runs from the address bus 592 to the segment register 580. The segment supplies a paged memory technique in order to overcome the limited addressing capability of the host computer. The host therefore, addresses the 1 megabyte database memory as 64 banks of 16K-bytes/page.

Figure 19:
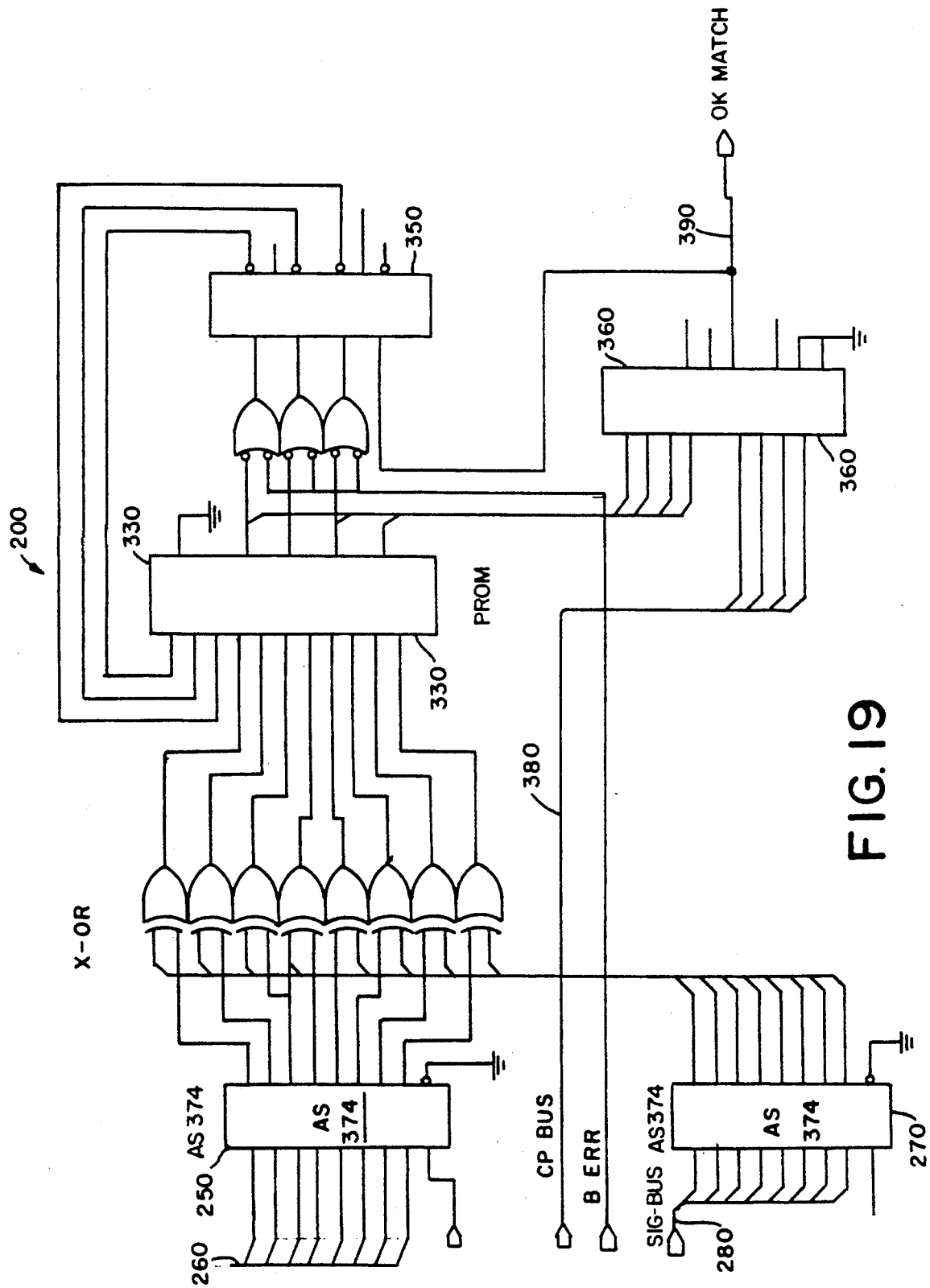
FIG. 19 is a more detailed schematic diagram of the bit difference accumulator of FIG. 15.

The bit difference accumulator 200, referring to FIGS. 15 and 19, include a first 8-bit register which is an octal memory holding latch 250 receiving an 8-bit bus 260 from the database memory 170 and a second similar register 270 receiving an 8-bit bus 280 from the signature register file in the interface 240 through which signatures under test are received. The memory holding register 250 has an 8-bit output bus 290 which is coupled to one input of an (8-bit) Exclusive-OR gate 300. The signature holding register 270 has an 8-bit output bus 310 which is coupled to a second input of the Exclusive-OR gate 300 whereby the bits of a new or real-time signature can be compared with the bits of a signature from the database. The output of the (8) Exclusive-OR gates 320 are coupled to the inputs of a PROM converter adder 330 the output of which is a 4-bit bus 340 which is coupled to the input of a 4-bit accumulator or latch 350. The output of the latch 350 is coupled by a bus 360 back to inputs of the converter 330.

The bit difference accumulator 210 also includes a magnitude comparator 360. The comparator 360 has inputs coupled by a 4-bit bus 370 to the output bus 340 between adder 330 and accumulator 350. The comparator 360 also has a second input which receives a 4-bit bus 380 from the comparator threshold register 582 register in the host interface by bus 380 by means of which an acceptable or threshold bit difference level signal is coupled thereto and it has an output match lead 390 on which a signal appears when a match of signature has less than the number of bits in difference or errors and recognition of a commercial scene signature are achieved.

Thus, it should be noted that in the comparison process, since the number of bits in difference are compared against a programmable threshold number, the "quality of fit" can vary over a range where all bits "match+ or the number of bits in difference can be as large as the threshold value. This provides spatial noise immunity.

A reset signal lead 526 runs from the sequencer 184 in the timing module 180 to the accumulator 350 to clear the accumulator as required.

Figure 20:
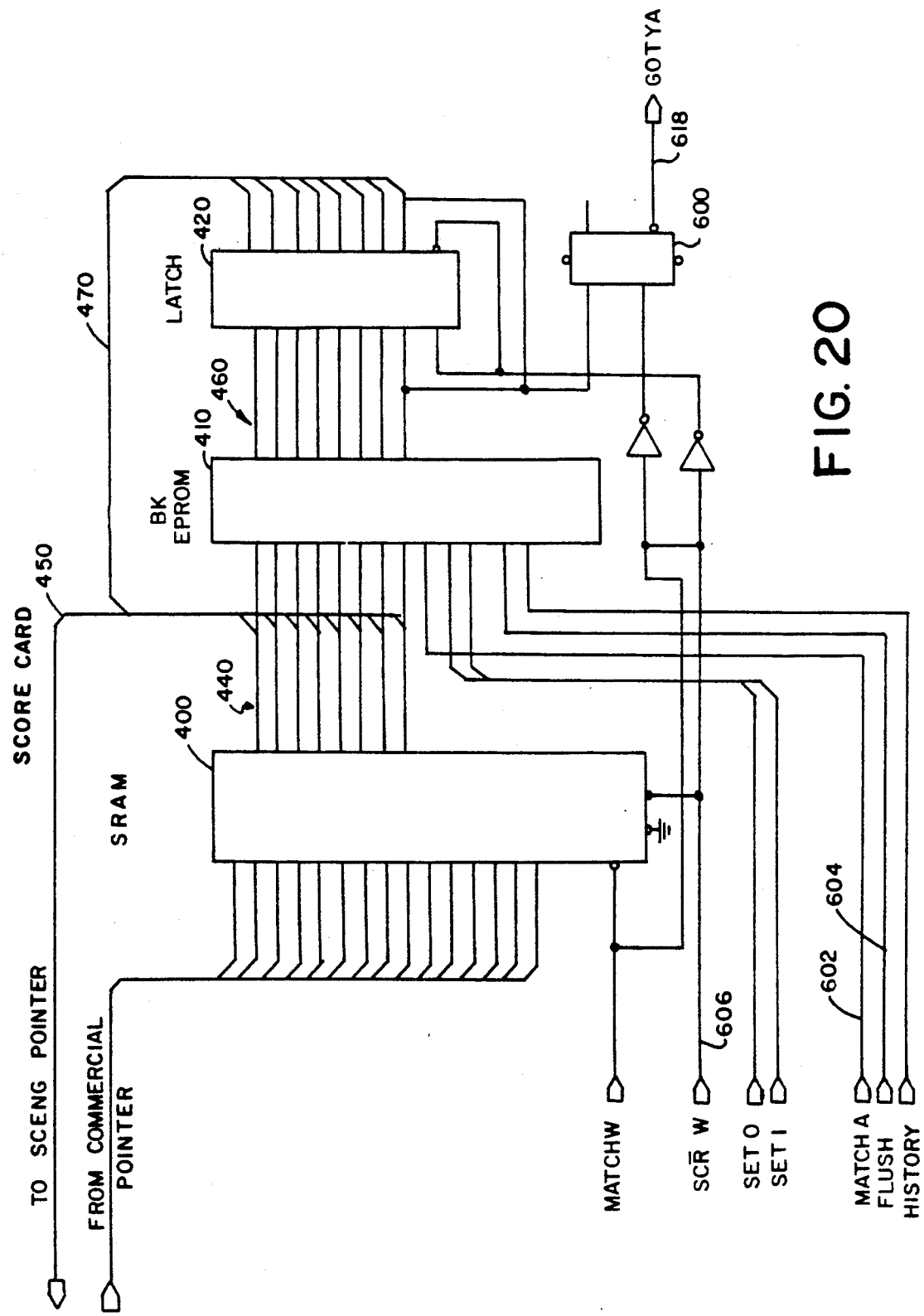
FIG. 20-21 are a more detailed schematic diagram of the score card module of FIG. 15.
Figure 21:
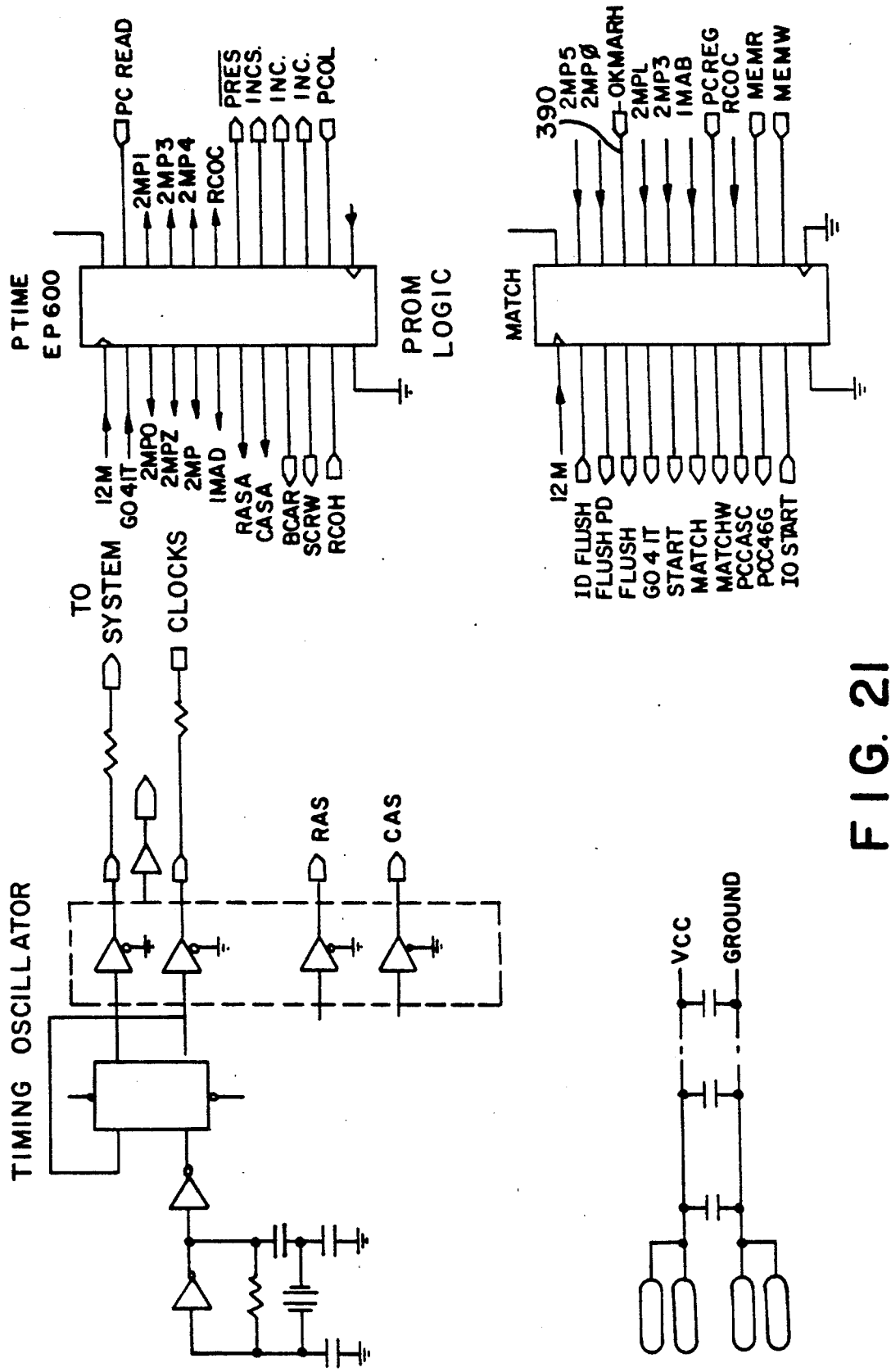
Figure 22:
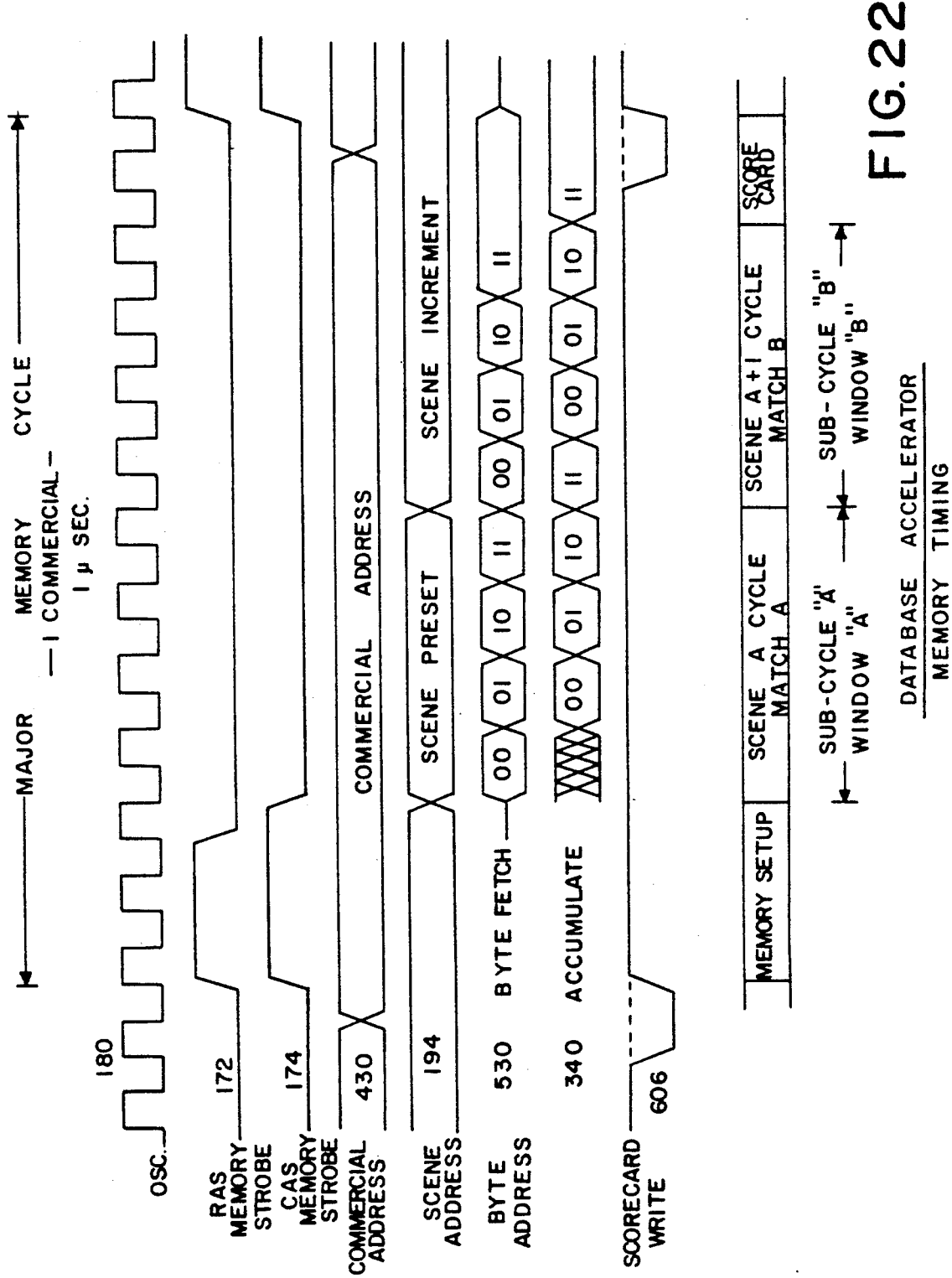
FIG. 22 is a timing diagram for the memory searching portion of the system of the invention.

The scorecard and controller 210, referring to FIGS. 19 and 20, include a 32K by 8-bit scorecard random access memory (RAM) 400 and a score card modification read only memory (ROM) 410 and a latch 420. The input to the RAM 400 is a 15-bit commercial bus 430 from the output of the 15-bit counter 192 in the address generator 190 and an 8-bit buss 440 connects the output of the score board RAM 400 to the input of the score card ROM 410. This bus 440 is also connected by a bus 450 to the scene select counter 194 in the address generator and to the output of latch 420. The output of the score card ROM 410 is coupled by bus 460 to the input of the latch 420 and the output of this latch is coupled by a bus 470 and bus 450 to the connecting bus 440 between the RAM 400 and the ROM 410 and to the scene counter 192. A lead 480 from the latch 420 generates a signal when a real-time commercial is identified.

Also shown is a 5-bit bus which is coupled to PROM 410, 4 bits coming from the host interface and 1 bit from the timing generator (match A).

The score card module 210 also includes a score card control module 600 which is part of the timing generator to control the time for reading the score card and writing back to the score card the modified results and includes a match A signal 602 and a flush signal 604 which runs between the score card control module 600 and the score card PROM 410. A score card write signal bus 606 runs from the score card control module 600 to the input of the score card RAM 400 and a "GO4IT signal" bus 608 runs from the scorecard control module 600 to timing and control modules. Clock buses 610 run from timing generator to the score card control module 600. Start signal 612 and flush signal 616 and busy signal 616 and busy signal 618 run from the host command generator 614 in the interface 240 to the score card control module 600.

The commercial identify register 500 in the host interface takes as its input the commercial pointer bus from the address generator and a clock line Gotya from the score card module. When Gotya signal is asserted, the commercial being tested is that commercial being a "ired" on the broadcast media. The system has found an acceptable match and identified it.

The search and compare portion of the system 10 utilizes real-time comparison of signatures and can examine the entire database of every possible signature pair of a "best fit" within 33 milliseconds. This high-speed comparison allows the system to decipher the difference between program material and commercials. The system requires no dependence on "black video" or other media cues or broadcast transitions to establish the beginning of where to "look" for the start of a video sequence. By virtue of the fact that it is looking all the time, this requirement has been eliminated.

Figure 16:
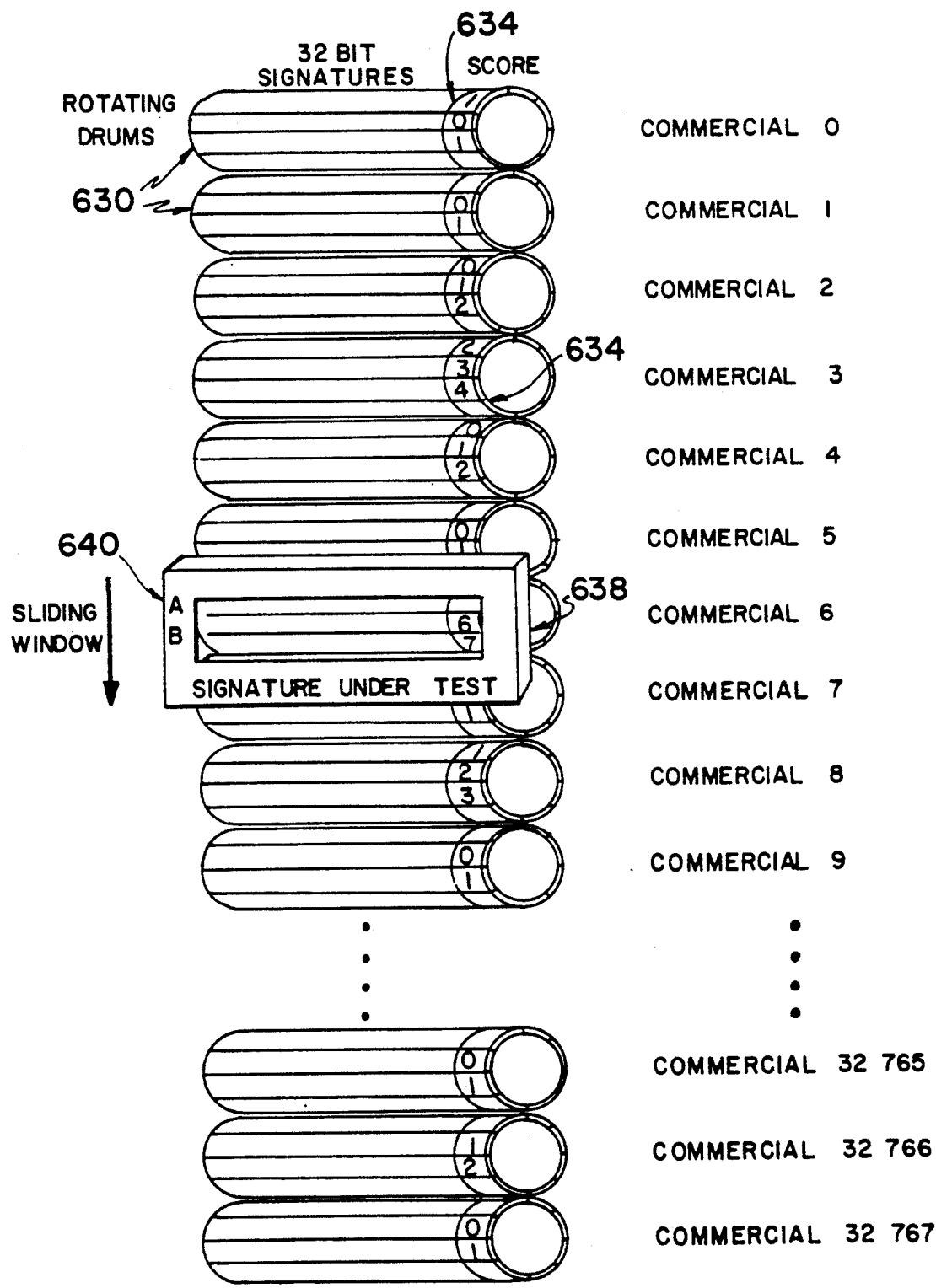
FIG. 16 is a mechanical model which illustrates operation of a portion of the system of the invention.

The system shown in FIG. 15 operates by comparing each real-time or broadcast TV signature with every signature in the database sequentially. Since a new, real-time signature is generated every 33 milliseconds (the time of one TV frame), the entire database must be searched and compared in that time period. However, due to limitations in the speed of the circuits of the system, and for proper sequencing through the database, the system operates by comparing the real-time signatures for two sequential (pairs of) signatures, back-to-back, referred to as window "A" signature and window "B" signature within the database. The timed needed to test all relevant signatures must be less than one TV frame time, or 33 milliseconds. This is illustrated in FIG. 16 which represents the signature pairing of the "A" and "B" comparison process in its simplest form, as a mechanical model. It shows the 8 selected signatures of a commercial placed on a rotating drum 630, one drum for each commercial. On the right hand side of each drum is an indicator 634 which shows the number of the specific signature selected. Also shown is a sliding window 638 with an opening 640 in it which allows for two signatures to be viewed at one time.

At the beginning of a comparison cycle this sliding window 638 is positioned over the first drum 630 marked "commercial 0", and if the first signature in the window matches the signature under test, the drum will be rotated one click. If the first signature did not match but the second signature matches, the drum will be rotated two clicks. If the drum was rotated two clicks, a mechanism on that drum will be engaged that prevents any future rotations of two clicks until the drum is returned to its zero position. After both signatures on the drum have been tested, the window is moved down to the next drum, corresponding to the next commercial, until all 32,768 drums have been viewed. This completes one scan of all commercial entries in the entire database leaving the window positioned over the first drum ("position 0") and ready for the next signature to be tested on the next TV frame.

The comparison cycles are repeated until any one of the drums viewed through the window has advanced enough to show signatures numbered 6 and 7. Thereafter, in this state if a signature match occurs on signature number 6 and the mechanism which inhibits two clicks is not engaged (representing seven consecutive signature matches), that drum represents the segment of interest or commercial and an identification is considered made. If the two click inhibitor was engaged (indicating a broken sequence of signature matches), the drum will be advanced one click to position 7 and no identification is made until such time as signature 7 matches the signature under test. In this condition, the system would provide the host 36 with the identity of the commercial or segment of video.

The comparison cycle is divided into 32,768 major memory cycles. There is one cycle for each commercial. The total comparison for the memory cycle takes 32.768 milliseconds, for all 32,768 commercials. This timing guarantees that all pertinent scenes of all commercials are accessed and compared in less than a single video frame time of 33 milliseconds. These major memory cycles are sub-divided into two parts, or sub-cycles; one part for scene "A" and the second sub-cycle for scene "B". The scene "A" cycle selects the scene addressed via the SCORECARD data. This data is the result of a previous comparison cycle and can be any scene from 0 thru 6 depending on how many previous scene matches have occurred. The "B" scene is always the "A scene+1" scene, or the next consecutive from that "scene A". These scenes may be thought of as being viewed through "windows" in time.

This two scene comparison technique provides a mechanism of matching any 7 of the 8 scenes of a commercial. Thus, temporal noise immunity is provided while maintaining a proper sequencing through the database circuits, as well as preventing the machine from continuously hunting for a signature which might never come because it was corrupted in transmission by interference or during the reception process.

If during the A part of a major memory cycle a match is found, a MATCHA signal is generated on the bus 602 and latched until the end of the major cycle. This MATCHA signal on bus 602 is connected to the SCORECARD MODIFICATION ROM 410 and is used to determine how to modify the SCORECARD RAM 400 for future comparisons.

The scorecard modification rules follow. This is how scenes are advanced:
IF MATCHA=1, THEN SCENE=SCENT+1, or;
IF MATCHA=0 AND MATCH=1 AND ERROR=0,
   THEN SCENE=SCENE+2, AND;
   ERROR=1 (this condition is permitted only once);
ELSE SCENE=SCENE+0 (means there were no matches)
where:
   MATCHA=a match on the A sub-cycle
   MATCH=a scene already skipped
this is how commercials are identified according to a "seven out of eight" algorithm:
IF   SCENE=6   AND   MATCHA=1   AND MATCH=1 AND ERROR=0,
   THEN GOTYA=1 (matched all seven in a row), or
IF   SCENE=6   AND   MATCHA=0   AND MATCH=1 AND ERROR=0 (matched on six in a row, plus the 8th),
   THEN GOTYA=1, or
IF SCENE=7 AND MATCHA=1, then ERROR AND GOTYA (commercial was found by seven out of eight, but not consecutively)
where:
   SCENE=6 is the 7th SIGNATURE
   SCENE=7 is the 8th SIGNATURE
   GOTYA=is the COMMERCIAL IDENTIFIED
These rules are firmware coded in EPROM circuit 410 (scorecard modification table).

This modified scene data is written back into the SCORECARD RAM 400 at the end of each major memory cycle and is used in the future for the next "signature under test" (SUT) from the acquisition module.

The module 34 contains a means of unconditionally resetting all SCORES in the SCORECARD RAM 400 to zero or the initial state. This function is referred to as "FLUSH" and is usually commanded on a power-on condition or after a commercial has been identified and acknowledged by the host 36.

Database module 34 also contains a means of conditionally resetting some of the SCORES in the SCORECARD RAM 400, and this function is referred to as a "HISTORY FLUSH CYCLE". Operation is as follows:

Each time a scene match signal is presented on signal bus 390, a bit within the SCORECARD RAM 400 is set on bus 440, indicating a recent activity for that particular segment of interest or commercial. Meanwhile, the host Computer 36, periodically requests a HISTORY FLUSH at a time rate slightly greater than the longest time anticipated for the longest segment of interest. If a HISTORY FLUSH is commanded and the HISTORY bit is set on bus 440 (indicating recent activity), the module clears the HISTORY bit on bus 440 and leaves the scene data on bus 440 unchanged;

But, if the HISTORY bit on bus 440 is cleared (indicating no activity for the scenes of that commercial since the last HISTORY FLUSH), the module clears the SCORE in the SCORECARD RAM 400, thus forcing that commercial to start over again at signature 0.

This HISTORY management is required in-order to prevent the SCORES from accumulating as noise over long periods of time. In applications of TV commercial recognition, the duration ratio of commercials to program material is between four-to-one and eight-to-one. This presents an undesirable number of signatures which could deteriorate reliability by causing the scenes to falsely accumulate in the SCORECARD RAM 400. The HISTORY MANAGEMENT circuits contained in module 410 prevent this occurrence by limiting the potential activity for a commercial to a duration slightly longer than the length of the longest anticipated commercial or segment of interest.

Considering the operation of the system in greater detail, at the beginning of a test and comparison cycle, the counters 192, 194 and 196 in the address generator 190 are set to zero and the bits or scores in the score card 210 are set to zero. Thus, the score card RAM 400 is set to the first signature (scene 0) or commercial 0. The 0 entry in the score card RAM 400 is coupled on leads 440 and 450 to the scene pointer 194. In the searching and comparing process, a first real-time TV signature is generated as described above and it is generated in the circuit shown in FIG. 2, and then fed through the interface 240 on buses 560 and 570 to the signature register file 540. For convenience, the 32-bit signature to be tested is broken up into 4-bytes of 8-bits each and it is similarly compared to stored signatures one byte at a time. Thus, the first byte of the signature to be tested is latched into the latch 270, from the register file 540. Simultaneously, the clock generator and sequencer 184 provides a signal on bus 520 to reset the byte pointer 196 so that, with the pointers 192 and 194 set to zero, the first byte of the zero signature of the zero commercial is fetched from the database on DRAM data bus 260 and is set into the latch 250.

The foregoing operation is carried out for the four sequential bytes of the signature under test and the four bytes of the first signature of the first video segment in the database.

The bytes in latches 250 and 270 (see FIGS. 15 & 19) are tested bit by bit in the Exclusive-OR comparator 300. The system is arranged to count bits in difference and the circuit 300 provides a logic "1" output when corresponding bits are different. The number of bits in difference is applied to PROM adder circuit 330, via bus 320, and stored in accumulator 350. This number is coupled on bus 362 to the second input to the PROM adder 330.

When the next byte under test is compared with the next byte of the first database signature, the bits in difference presented out of the Exclusive-OR gate 300 is fed into the PROM adder 330 and into the accumulator 350 where it is added to the previous number therein and this is coupled on bus 360 to the PROM adder 330. After all four bytes of the signature under test and the signature from the database are (compared) tested, the total number of different bits are coupled on bus 370 to another comparator 360 which contains a value to be used as a threshold tolerance regarding a maximum number of acceptable bits. This value is the "B" input to the comparator 360 on bus 380 which brings the acceptable number from the compare register or threshold register 582 previously set by the host computer 36.

If the total number of bits in error is less than the acceptable limit, a signal appears on lead 390 which means that a 'match' of signatures has been achieved. This information is fed to the score card control module 600. This module is supplied clock information from module 184 on bus 610 by which it knows the signature match was an "A" signature or a "B" signature and records this fact by setting a latched signal in module 600 called "match A" reflected on lead 602. A reset byte signal on lead 520 is fed from the clock generator and sequencer 184 to byte pointer 196 to prepare it for the next testing the "B" time window. At that same time, an increment pulse is fed from the clock generator and sequencer to the scene pointer 194 so that the test will now take place for the second signature of a pair, in this case signature number 2 of the "0" commercial. The test of the "B" signature of the "0" commercial follows immediately in a manner described above.

If there is a match of either signature, a signal called "score card write" runs along lead 606 to the scorecard RAM 400 to record the fact that a signature from the database has been matched, and instructs the system as to which signature is to be placed into time "window A" for that commercial on the very next pass through the database. This causes the entry of a "1" in RAM 400 for the "0" signature or scene of commercial "0". This fact will be entered in the score card module and the address generator will then be loaded with the next sequential position to test the first signature from the acquisition module with the "A" and "B" signatures of the "1" commercial.

This test procedure is carried out for the first test signature against all commercials in the database. The system moves from one commercial to the next by means of a signal on the increment commercial bus 528 from the sequencer 184, to the commercial pointer 192.

As signatures in the database are matched for successive broadcast signatures, the scorecard RAM 400 and PROM 410 are incremented and, as described above when seven consecutive signatures of a database commercial have been matched, a numerical index signal appears on bus 622 (GOTYA) to the commercial ID register 500 which also receives the commercial identifier on bus 430. The register 500 presents this information to the host computer via host data interface 550. The host computer includes a table which includes all pertinent information related to the identified commercial and this information is displayed and/or printed out for use by an operator.

Figure 23:
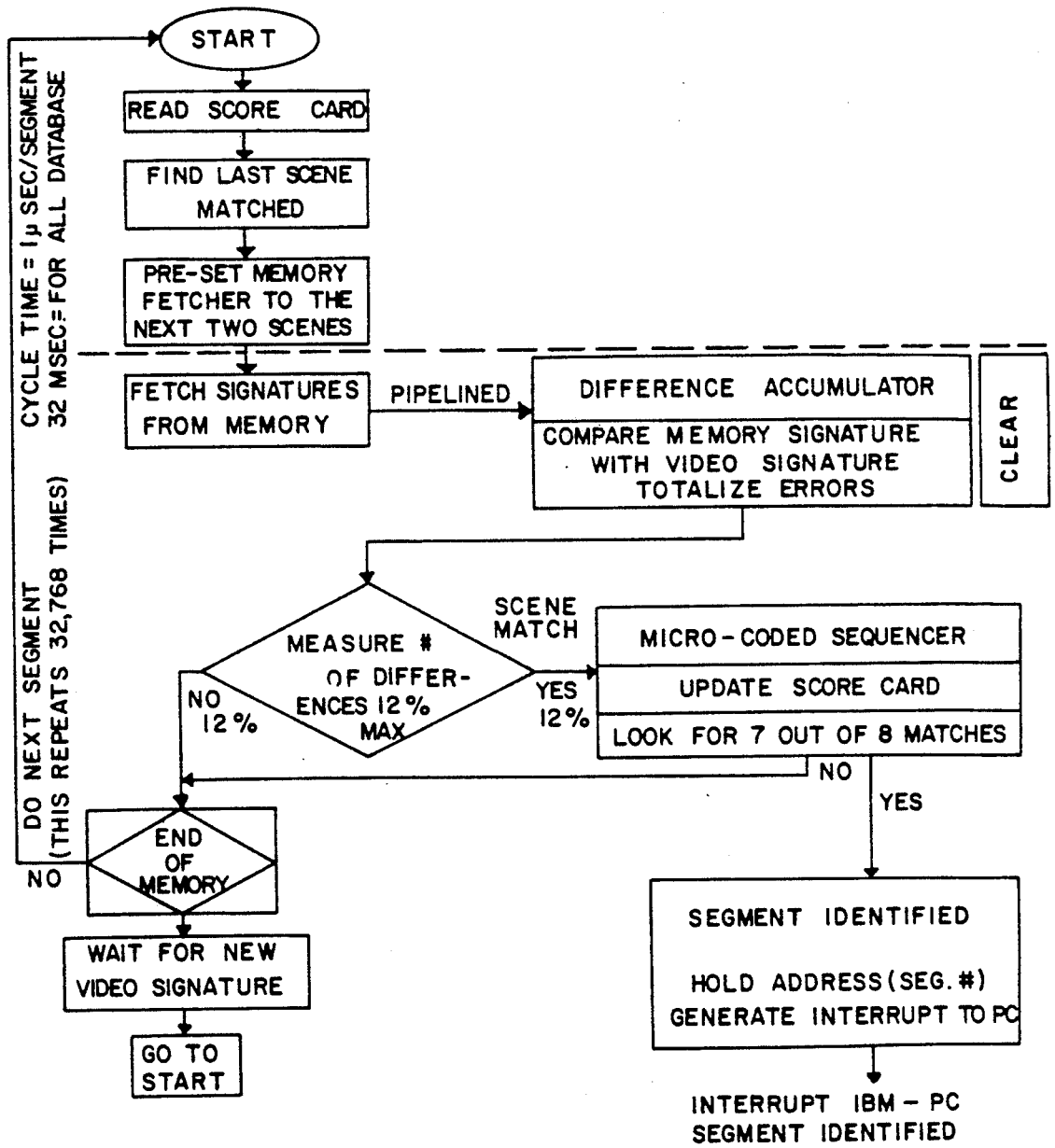
FIG. 23 is a flow chart for the search process of the invention.
Figure 24:
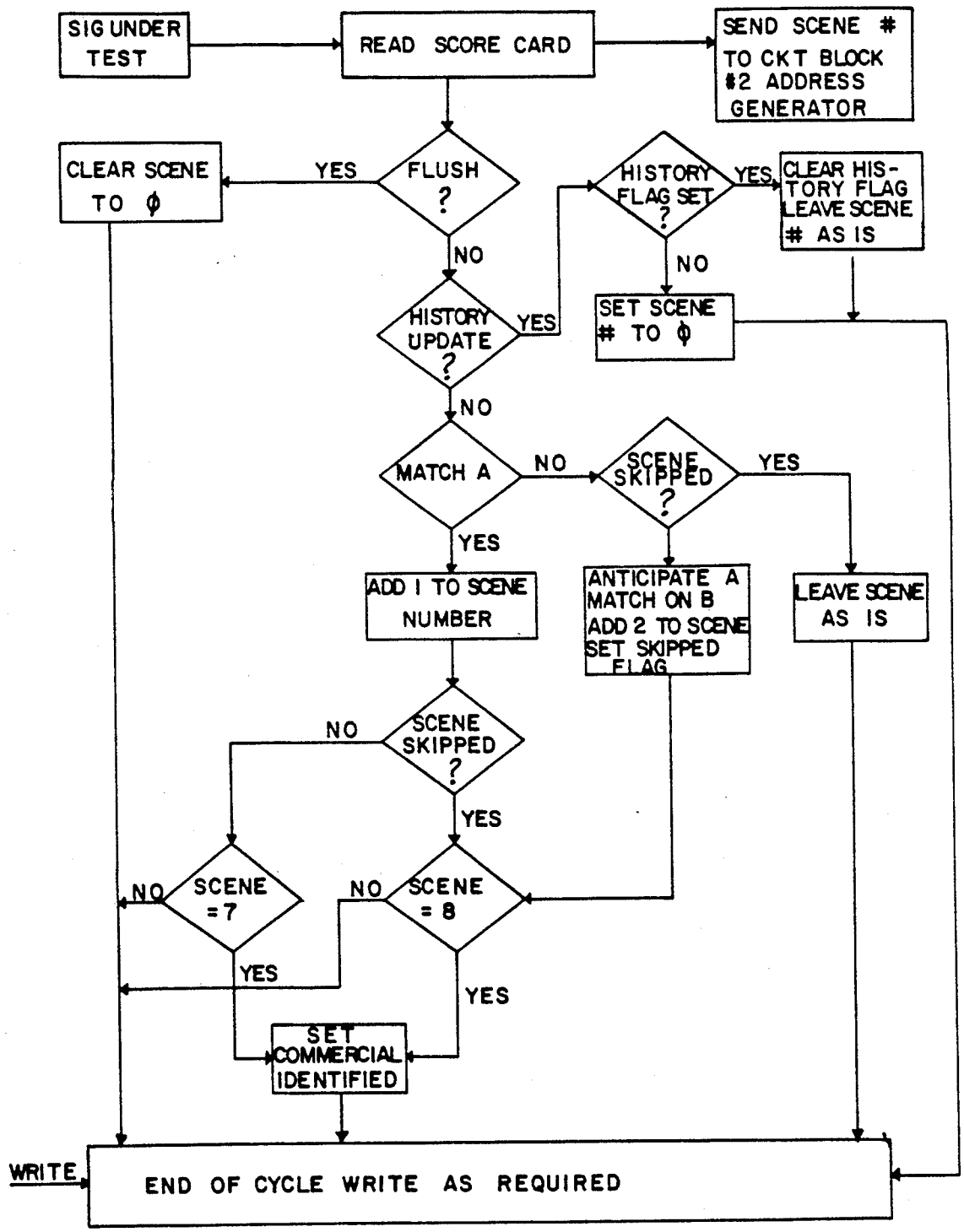
FIG. 24 is a more detailed flow chart.
Figure 25:
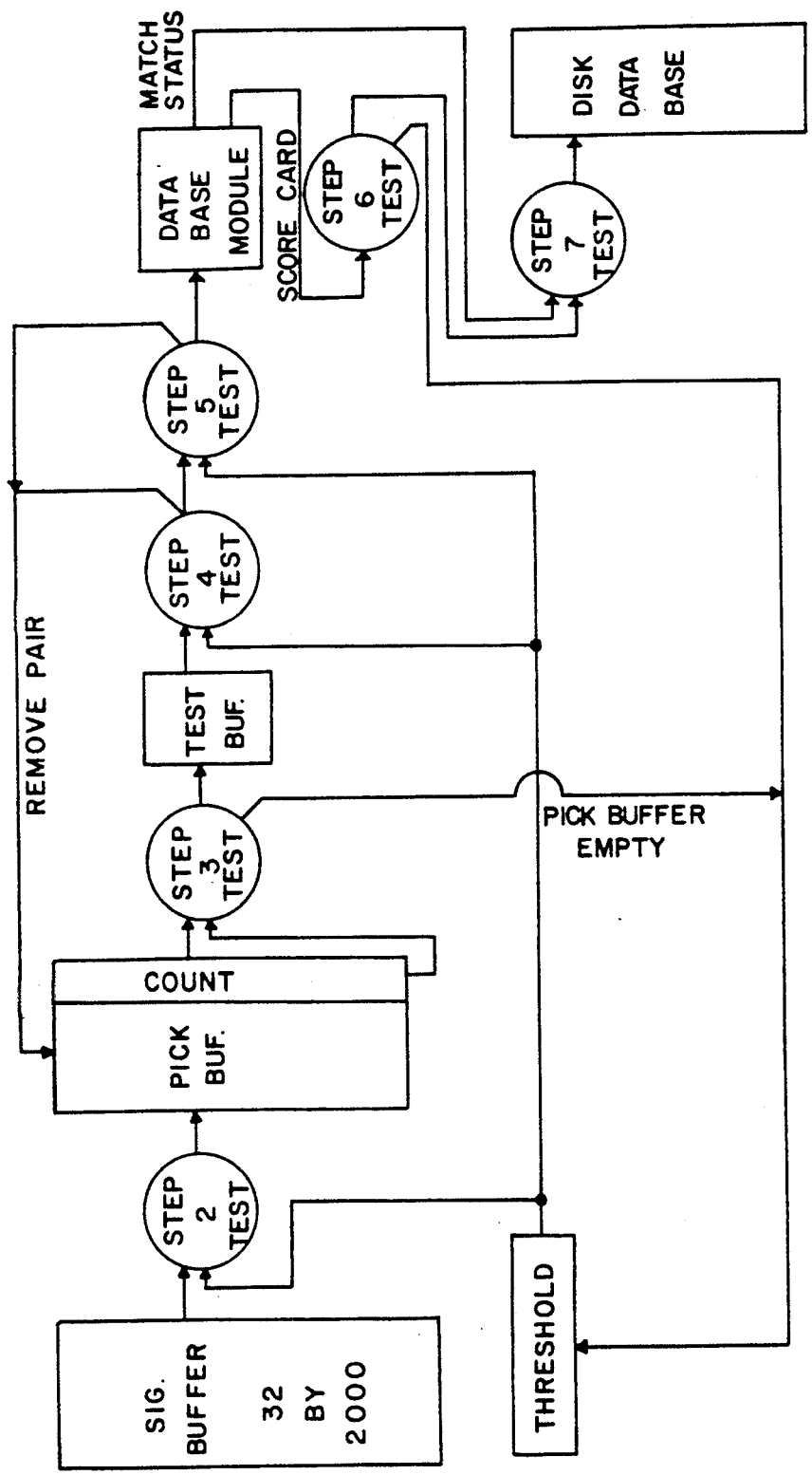
FIG. 25 is a flow diagram for the 'pick algorithm'.

Two flow charts showing steps which occur in the database comparison process are in FIG. 23 and in more detail in FIG. 24.

Those skilled in the art will appreciate that the principles of the invention are applicable to other signal encoding and comparing application areas, besides TV commercials. As an example, these same system principles may be used to read bar codes, identify defective parts in video inspection systems, and the like.

APPENDIX B

The purpose of the 'pick' function is to choose eight video signatures from a previously collected video segment file. These signatures are chosen in concert with the database module 34 in order to assure that they not only best describe the video segment of interest but also cause no interaction with signatures already in the data base. It is also desirable that signatures have a very high probability of repeating at a later time when the system is in the recognition mode. The eight signatures chosen are saved in a disk data base file that is loaded into database module 34 DRAM 170 prior to running the recognition function.

The signature format saved in the data base are:
Signature 1—first chosen
Signature 2—second
Signature 3—third
Signature 4—fourth
Signature 5—fifth
Signature 6—sixth
Signature 7—seventh
Signature 8—last These eight signatures are saved in relative time sequence. The recognition function should match signature 1 first followed by 2, and so on. However, as will be clear later, there is no limit to the time that separates any two sequential signature pairs chosen.

A single signature match occurs when any signature passed from signature generator 30 is waiting an acceptable error tolerance of the signature in database module 34 DRAM 170. A video segment match occurs in two ways:
1. Matching of signature 1 thru 7 in sequence, or
2. Matching of signature 1 thru 8 in sequence with one signature skipped.

In order to satisfy the above conditions of segment matching, the pick function uses 3 criteria in order to choose the 8 signatures used to describe a video segment:
1. All signatures considered must have a high probability of repeating at a later time (recognition function).
2. The pick function is discriminating so that is assures consecutive signatures (1-2, 2-3, 3-4 . . . ) are different enough from each other from the incoming stream of signatures will cause only a single scene match.

3. Since database module 34 allows one signature to be 'skipped', the pick function uses data base module 34 to assure that alternate pairs of signatures are different from each other in order to prevent any signature from being inadvertently skipped.

The pick function uses disk files that were collected at a previous time and contain the following:
1. The name of the video segment.
2. Video signatures created by signature generator 30 saved in a time sequence. These files can contain anywhere from 30 to 1950 signatures (1 to 65 seconds of collected video).

The first step of the pick function is to read all of the signatures from the collect disk file into the host computer memory. Once in memory, the actual picking of signatures begins.

The Pick Algorithm

Start: The current data base is loaded into database module 34 so that candidate segments can be checked against all older segments.

Step 1: Set acceptable bit difference thresholds for repeat test (Step 2) and for the bit difference tests in Step 2 thru 5.

Step 2: All of the signatures collected are checked in sequence and groups of signatures that repeat in sequence with less than the tolerance set in step 1 are saved in a pick buffer. Sign that repeat static video (scenes with very little change) over time. These signatures satisfy the criterion that signatures "picked" must have a high probability of repeating during the recognition function.

Step 3: Eight signatures from the pick buffer are placed in a test buffer.

Step 4: Each consecutive signature pair (1 and 2, 2 and 3, 3 and 4 . . . ) in the test buffer are compared for bits difference. Any consecutive signature pair that fails to meet the tolerance set in Step 1 are removed from the pick buffer. This test continues from Step 3 until 8 signatures are found that meet the Step criterion. If the pick buffer is exhausted during this test, the function adjusts the tolerances set in Step 1 and starts again at Step 2. This test assures that the signatures chosen meet pick criteria 2, maximum difference between consecutive pairs.

Step 5: Each alternate signature pair (signature 1 and 3, 2 and 4 . . . ) from Step 4 is checked for bits in difference. Any pair that fails to meet this test is removed from the pick buffer and the test resumes from Step 3. Step 5 satisfies the third pick function criteria, prevent signature skipping do to a repeating sequence of the same signature. Steps 2-5 are repeated until 8 signatures are found.

Step 6: The 8 candidate signatures picked by Steps 2-5 are loaded into the database module 34 DRAM 170. Each collected signature is then passed to the data base module 34 and a match command is issued. After each match cycle is complete, the pick function reads Scorecard SRAM 400 and host Command and Status 614 and maintains the history of both. After all collected signatures have been matched, the scorecard and status history is checked. If the candidate location generated a segment match on signature 7 (no signatures skipped), the 8 signatures picked in Steps 2-5 have met the three pick criterion and can be added to the database. If no match occurred or a match on signature 8 (a signature was skipped), the entire sequence is restarted from Step 2 after adjusting the check tolerances.

Step 7: The host status history saved in step 6 is checked. If other segments along with the candidate caused a match, the candidate is a duplicate of the other segments already in the database. The pick function marks the candidate segment as a duplicate before putting it in the database.

What is claimed is:

1. Apparatus for continuous pattern recognition of broadcast video segments comprising
first means for digitally parametizing all of the pixels in all of the frames of video segments to be recognized to form multi-bit digital signatures therefrom related to the luminance of each pixel in each frame in accordance with a set of predetermined rules,
said first means including a memory in which the digitally parametized pixels are all stored as digital words and in a TV frame orientation of a plurality of lines corresponding to the frame from which they were derived, said first means also including means for processing substantially all of said parametized pixels to form a digital signature,
memory means coupled to said first means for storing said signatures as a database, there being groups of stored signatures for each segment to be recognized,
means for monitoring a broadcast video transmission,
means for receiving said broadcast video transmission and digitally parametizing all of the pixels in all of the frames of said video transmission to form a multi-bit digital test signature from each frame of said broadcast signal in accordance with said set of predetermined rules, and
means for coupling said test signatures to said database and comparing each of said test signatures separately with every signature in all of the groups of signatures in said database whereby a match of a test signature and a stored signature occurs if the number of digital bits matched is equal to or greater than a predetermined number.

2. Apparatus for continuous pattern recognition of broadcast video segments comprising
first means for digitally parametizing all of the pixels in all of the frames of video segments to be recognized and arraying all of the digitized pixels in a memory in a frame pattern and processing substantially all of said digitized pixels to form multi-bit digital signatures therefrom related to the luminance of each pixel in each frame in accordance with a set of predetermined rules,
memory means coupled to said first means for storing said signatures as a database, there being groups of stored signatures for each segment to be recognized,
means for monitoring a broadcast video transmission,
means for receiving said broadcast video transmission and digitally parametizing all of the pixels in all of the frames of said video transmission to form a multi-bit digital test signature from each frame of said broadcast signal in accordance with said set of predetermined rules, and
means for coupling said test signatures to said database and comparing each of said test signatures separately with every signature in all of the groups of signatures in said database whereby a match of a test signature and a stored signature occurs if the number of digital bits matched is equal to or greater than a predetermined number and a match of a broadcast segment with a stored segment occurs when the number of signatures in a group in the database which are matched by test signatures from a broadcast signal is equal to or greater than a predetermined number.

3. The method of creating a digital signature from a frame of a TV transmission comprising the steps of forming a digital work of every pixel in a frame of a TV transmission and storing all of said digital words of a frame in a memory, each digital word representing the luminance of the pixel, arraying all of the digital words in the frame into rows and columns of groups of digital words in said memory, said groups being arrayed over the entire frame and being uniformly spaced from each other and representing geometric areas of light and dark spots, and comparing each group of digital words with another group of digital words, the two groups being compared preferably having considerably different picture content in said frame, each comparison producing a digital bit with the total number of bits of the frame representing the digital signature of the frame.

4. The method defined in claim 3 where each said group comprises a rectangular array of 16 by 16 digital words.

5. The method defined in claim 4 wherein there are 64 of said groups of digital words called super pixels and the comparisons of one group with another group produce 32 bits which comprise the relative luminance and geometric features represented by the signature of the frame, and said resulting signature being tolerant of signal transmission and reception quality variations.

6. The method defined in claim 4 wherein there are 64 sets of said groups of digital words and each is compared with a group specially positioned on said frame so that the ares of the frame of significance are compared, the comparison process producing 32 bits which comprise the signature of said frame.

7. The method defined in claim 5 wherein said 64 groups of digital words are arranged in rows and columns with uniform spacing between them to provide maximum entropy.

8. The method defined in claim 5 wherein said 64 groups of digital words cover substantially the entire area of a frame.

9. The method of analyzing and comparing two video transmissions to determine whether selected transmissions are present, comprising the steps of receiving a first video transmission comprising a plurality of frames of information, creating a first digital signature from each frame of said first video transmission, selecting a plurality of said first digital signatures which provide maximum information about said first video transmission and storing said plurality of first digital signatures in an electronic database memory, receiving a second video transmission comprising a plurality of frames of information, creating a second digital signature from each frame of said second video transmission, comparing each second digital signature with each of the first signatures in said memory to find first signatures which match each second signature, wherein said second video transmission matches the first video transmission when a predetermined number of signatures stored in said memory match a number of signatures in said second video transmission.

10. The method defined in claim 9 wherein a first signature is compared with a second signature by the digital bits of one being compared with the digital bits of the other to determine the number of digital bits which do not match.

11. The method defined in claim 10 wherein each signature comprises 32 bits and the signatures are compared eight-bit segments at a time from each, each comparison of eight-bits producing a number of bits which are different and the comparison of all eight-bit segments of said signatures producing a total number of bits which are different, the two signatures matching when the total number of different bits is equal to or less than a predetermined number.

12. The method defined in claim 9 wherein said first video transmission is formed into a plurality of groups of first signatures, each group representing a TV commercial.

13. The method defined in claim 12 wherein all of said signatures are formed by the same method.

14. The method defined in claim 9 wherein each step of forming a digital signature includes digitizing every pixel of every frame of information.

15. A method of creating a digital signature from a defined length of electrical signal information comprising the steps of receiving a length of electrical signal information made up of a plurality of discrete signal areas each having a unique electrical characteristic, each such signal area comprising a pixel of information, forming a digital word from every pixel in said length of electrical information, each digital word representing said electrical characteristic of said pixel from which it was formed, storing each of said digital words in a memory both serially in a line and in a plurality of lines representing the form of a frame of a TV picture, arraying said digital words in groups with the groups having uniform spacing between them, and electronically averaging and comparing pairs of said groups of digital words and forming a super pixel from each comparison, each super pixel having a digital bit value and all of the super pixel bits formed comprising the digital signature of said length of electrical information.

16. The method defined in claim 15 wherein the pairs of groups which are averaged and compared are relatively remote from each other and having different characteristic values.

17. The method defined in claim 15 and including the step of providing an average value for each group of digital words before said comparisons are made.

18. The method of analyzing and comparing video transmissions to determine whether selected transmissions are present, comprising the steps of receiving a first video transmission comprising a plurality of frames of information, creating a first digital signature from each frame of said first video transmission, selecting a plurality of said first digital signatures which provide maximum information about said first video transmission and storing said plurality of first digital signatures in a first group in an electronic database memory, receiving a second video transmission comprising a plurality of frames of information, creating a second digital signature from each frame of said second video transmission, selecting a plurality of said second digital signatures which provide maximum information about said second video transmission and storing said plurality of second digital signatures in a second group in said electronic database memory, receiving a third video transmission to be analyzed to determine whether it is present in said database, said third video transmission comprising a plurality of frames of information, creating a test digital signature from each frame of said third video transmission, and comparing each test signature with each of the signatures in said database memory to find stored signatures which match each test signature, the match of a predetermined number of test signatures with a number of signatures in a group of stored signatures constituting a match of said third transmission with the video transmission represented by the group of stored signatures which has been matched.

19. Apparatus for continuous pattern recognition of broadcast video segments comprising means for digitally parametizing frames of video segments to be recognized and forming multi-bit digital signatures therefrom related to the luminance of each pixel in a frame in accordance with a set of predetermined rules, means for storing said signatures in a database memory, there being groups of stored signatures for each segment to be recognized, means for monitoring a broadcast signal, means for digitally parametizing frames of said monitored signal to form a multi-bit digital test signature from each frame in accordance with said set of predetermined rules, and means for comparing each of said test signatures separately with every signature in said database whereby a match of a test signature and a stored signature occurs if the number of digital bits matched is equal to or greater than a predetermined number, a match of a broadcast segment with a stored segment occurring when the number of signatures in a group in the database which are matched by test signatures from a broadcast signal is equal to or greater than a predetermined number.

20. The apparatus defined in claim 19 wherein said means for comparing comprises a first storage means for holding a stored signature and a second storage means for holding a test signature, an Exclusive-OR gate means coupled to said first and second storage means for detecting the number of digital bits of said signatures which do not match, and means coupled to said OR gate means for recognizing whether said number of bits is equal to or less than a predetermined number to represent a match between said signatures.

21. The apparatus defined in claim 20 wherein said last named means includes adding means for adding the number or digital bits which do not match and providing an output signal to indicate a match of signatures.

22. The apparatus defined in claim 21 wherein said output signal is coupled to scorecard means for keeping track of stored signatures which are matched and steering the test procedure through said database from signature to signature.

23. A method for creating a digital signature from a frame of a video signal comprising the steps of receiving a frame of video information made up of a plurality of lines of video information, each line of video information being made up of discrete signal areas each having a luminance level, each such signal area being called a pixel, forming a digital word of every pixel in every line of said frame of video information, each digital word representing the luminance of the pixel from which it was formed, storing said digital words in a memory in a pattern to form a memory frame corresponding to the frame pattern of the corresponding pixels in said frame of video information, arraying said digital words in groups in said memory with the groups being arrayed in rows and columns over substantially said entire memory frame, with substantially uniform spacing between adjacent groups, and electrically averaging groups of said digital words to form super pixels and then comparing pairs of said super pixels, each such comparison forming a digital bit and all the bits thus formed comprising a digital signature of said frame.

24. The method defined in claim 23 wherein the pairs of groups which are averaged and compared are relatively remote from each other and have different characteristic values.

25. Apparatus for recognition and identification of segments of TV transmissions comprising first means for receiving a plurality of segments of TV transmissions and forming multi-bit digital signatures from each frame of each segment thereof and selecting a group of signatures for each said segment, a memory in which all of said groups of signatures are stored as a database, second means for receiving real time TV transmissions which may contain one or more of said segments and forming multi-bit digital test signatures from each frame thereof, an address generator coupled to said memory database for addressing each group of signatures therein sequentially and for addressing each signature in each group sequentially, third means known as a bit difference counter including:

a first holding register having an input and an output, its input being coupled to said database and adapted to receive stored signatures therefrom one at a time, a second holding register having an input and an output, its input being coupled to said source of test signatures, to receive test signatures therefrom, the outputs of said first and second holding registers being coupled to fourth means for comparing a database signature with a test signature to determine the number of digital bits in each which do not match and thereby to determine database and test signatures which match, and fifth means coupled to the output of said third means for registering the number of test signatures which match signatures in a group of database signatures, the match of a predetermined number of test signatures with signatures in a group in said database signifying the match of a stored TV transmission with a real time TV transmission.

26. The apparatus defined in claim 25 wherein said first and second holding registers are coupled to an Exclusived-OR gate as means for comparing the digital bits of said database signature and said test signature and providing an output representing the number of bits which are different, and said fourth means comprises a comparator for receiving said number of bits which are different and a threshold number representing an acceptable number for said number of bits, said comparator providing an output representing a match of signatures when said number of bits is equal to or less than said threshold number.

27. The apparatus defined in claim 26 wherein said first and second storage means receive equal portions of said storage and test signatures at a time and the number of bits are added to provide a total number as said portions are processed.

28. The apparatus defined in claim 26 wherein said fourth means includes gate means for comparing the bits of a database signature with the bits of a test signature, accumulator means coupled to the output of said gate means for accumulating the total number of bits which are different between said database signature and said test signature, and a comparator circuit coupled to said accumulator means receiving said total number and a threshold number and comparing said total number and said threshold number to determined whether there is a match.

29. The apparatus defined in claim 28 wherein said accumulator means includes means for converting a number of bits to a digital number.

30. The apparatus defined in claim 25 wherein said address generator is adapted to address sequentially first the first signature in each group of signatures and then the second signature in each group of signatures and then the third signature in each group of signatures and so on until all of the signatures in the database have been compared with a test signature.

31. The apparatus defined in claim 25 wherein said address generator includes a first counter coupled to said address generator for selecting a group of commercials to be compared with a test signature and a second counter coupled to said database for selecting a particular signature in a group of signatures, and sequencing means, called a scorecard circuit, coupled to said address generator for cycling the comparing of a test signature with each of the signatures in said database and each of the groups of commercials.

32. The apparatus defined in claim 31 wherein said sequencing means cycles said address generator through said groups of signatures sequentially and sequentially through the signatures in each group.

33. The circuit defined in claim 31 wherein said scorecard circuit includes a first memory having a portion for each group of signatures in said database memory, a second memory including means for keeping track of signature matches, and a control circuit for receiving a match signal from said bit difference accumulator and coupled to said second memory, said first and second memory being coupled to said address generator to take part in causing the cycling through said signatures in said database memory.

34. The apparatus defined in claim 33 wherein said second memory includes means for providing an output signal when a test segment matches a group of signatures in said database memory.

35. The apparatus defined in claim 34 and including a host computer which receives said output signal and provides identification of the matched group of signatures.

36. The method defined in claim 18 wherein each group of signatures in said database includes a firs signature, a second signature, a third signature and a fourth signature, each test signature being compared with the first signature of each group to see if there is a match and then with each second signature of each group to see if there is a match and then with each third signature of each group to see if there is a match and then with each fourth signature to see if there is a match, each test signature matching a signature in said groups when the non-matching digital bits between them is less than a predetermined number, and each third video transmission including a portion which is present in said database memory when a predetermined number of test signatures match a number of signatures in any one of said groups.

* * * * *